(12) United States Patent
Gehre et al.

(10) Patent No.: US 11,465,113 B2
(45) Date of Patent: Oct. 11, 2022

(54) USE OF A REACTOR, METHODS, AND DEVICE FOR QUANTITATIVELY OBTAINING MOLECULAR HYDROGEN FROM SUBSTANCES

(71) Applicant: Thermo Fisher Scientific (Bremen) GmbH, Bremen (DE)

(72) Inventors: Matthias Gehre, Leipzig (DE); Julian Renpenning, Leipzig (DE); Steffen Kuemmel, Leipzig (DE)

(*) Notice: Subject to any disclaimer, the term of this patent is extended or adjusted under 35 U.S.C. 154(b) by 320 days.

(21) Appl. No.: 15/550,724

(22) PCT Filed: Feb. 11, 2016

(86) PCT No.: PCT/EP2016/052902
§ 371 (c)(1),
(2) Date: Aug. 11, 2017

(87) PCT Pub. No.: WO2016/128510
PCT Pub. Date: Aug. 18, 2016

(65) Prior Publication Data
US 2018/0021746 A1    Jan. 25, 2018

(30) Foreign Application Priority Data

Feb. 13, 2015   (DE) ............... 10 2015 102 126.9
Feb. 25, 2015   (DE) ............... 10 2015 102 710.0

(51) Int. Cl.
| | |
|---|---|
| *B01J 6/00* | (2006.01) |
| *B01J 19/00* | (2006.01) |
| *B01J 19/02* | (2006.01) |
| *B01D 53/02* | (2006.01) |
| *B01J 23/26* | (2006.01) |

(Continued)

(52) U.S. Cl.
CPC ............ *B01J 6/008* (2013.01); *B01D 53/025* (2013.01); *B01J 19/0093* (2013.01); *B01J 19/02* (2013.01);

(Continued)

(58) Field of Classification Search
CPC ..... B01D 53/025; B01J 19/0093; B01J 19/02; B01J 2219/00792; B01J 2219/00822;

(Continued)

(56) References Cited

U.S. PATENT DOCUMENTS

| | | |
|---|---|---|
| 4,569,918 A | 2/1986 | Moore et al. |
| 5,205,845 A | 4/1993 | Sacks et al. |
| 2013/0243687 A1* | 9/2013 | Ozaki ................ B01J 23/34 423/651 |

FOREIGN PATENT DOCUMENTS

| | | |
|---|---|---|
| DE | 19816348 C1 | 8/1999 |
| EP | 0258907 A2 | 3/1988 |

(Continued)

OTHER PUBLICATIONS

Kelly et al. "Deuterium/hydrogen isotope ratio measurement of water and organic samples by continuous-flow isotope ratio mass spectrometry using chromium as the reducing agent in an elemental analyser", 2001, Rapid commun. Mass Spectrom. 15:1283-1286 (Year: 2001).*

(Continued)

*Primary Examiner* — Steven J Bos
*Assistant Examiner* — Syed T Iqbal

(57) ABSTRACT

The invention relates to the use of a reactor, methods, and devices for the quantitative recovery of molecular hydrogen from solid, liquid, or gaseous substances which contain hydrogen and which have heteroatoms, as well as to reactors. In this case, the reactors have material containing chromium. The subject matter of the invention also includes the use of the reactor, the method, and the device for the compound-specific or component-specific measurement of the isotope ratio ($\delta^2 H$) of hydrogen using online apparatuses.

17 Claims, 12 Drawing Sheets

(51) Int. Cl.
| | |
|---|---|
| *B01J 35/02* | (2006.01) |
| *C01B 3/22* | (2006.01) |
| *C10B 1/04* | (2006.01) |
| *C10B 49/02* | (2006.01) |
| *C10B 57/16* | (2006.01) |
| *G01N 30/02* | (2006.01) |
| *H01J 49/26* | (2006.01) |

(52) U.S. Cl.
CPC ............ *B01J 23/26* (2013.01); *B01J 35/026* (2013.01); *C01B 3/22* (2013.01); *C10B 1/04* (2013.01); *C10B 49/02* (2013.01); *C10B 57/16* (2013.01); *B01J 2219/00792* (2013.01); *B01J 2219/00822* (2013.01); *B01J 2219/00837* (2013.01); *B01J 2219/00873* (2013.01); *B01J 2219/00916* (2013.01); *B01J 2219/029* (2013.01); *B01J 2219/0236* (2013.01); *B01J 2219/0277* (2013.01); *C01B 2203/0277* (2013.01); *C01B 2203/1041* (2013.01); *C01B 2203/1211* (2013.01); *G01N 2030/025* (2013.01); *H01J 49/26* (2013.01)

(58) Field of Classification Search
CPC .... B01J 2219/00837; B01J 2219/00873; B01J 2219/00916; B01J 2219/0236; B01J 2219/0277; B01J 2219/029; B01J 23/26; B01J 35/026; B01J 6/008; B01J 8/02; B01J 19/24; C01B 2203/0277; C01B 2203/1041; C01B 2203/1211; C01B 3/22; C01B 3/24–30; C10B 1/04; C10B 49/02; C10B 57/16; G01N 2030/025; G01N 30/84; H01J 49/26
See application file for complete search history.

(56) References Cited

FOREIGN PATENT DOCUMENTS

| | | | | |
|---|---|---|---|---|
| EP | 0258907 B1 | * | 4/1991 | ........ B01J 19/0026 |
| GB | 479438 A | * | 2/1938 | ............ C07C 11/24 |
| GB | 479438 A | | 2/1938 | |

OTHER PUBLICATIONS

Shouakar-Stash et al. "Online methodology for determining compound-specifichydrogenstable isotope ratios of trichloroethene and 1,2-cis-dichloroetheneby continuous-flow isotope ratio mass spectrometry", Rapid Commun. Mass Spectrom. 2013, 27, 1335-1344 (Year: 2013).*

Gehre et al., "Continuous flow 2H/1H and 18O/16O analysis of water samples with dual inlet precision," Rapid Communications in Mass Spectrometry, 18, 2650-2660, 2004.

Kelly et al., "Deuterium/hydrogen isotope ratio measurement of water and organic samples by continuous-flow isotope ratio mass spectrometry using chromium as the reducing agent in an elemental anlayser," Rapid Communications in Mass Spectrometry, 15, 1283-1286, 2001.

Shouakar-Stash et al., "Online methodology for determining compound-specific hydrogen stable isotope ratios of trichloroethene and 1,2-cis-dichloroethene by continuous-flow isotope ratio mass spectrometry," Rapid Communication in Mass Spectrometry, 27, 1335-1344, 2013.

Armbruster et al., "Establishing a chromium-reactor design for measuring delta-2-H values of solid polyhalogenated compounds using direct elemental analysis and stable isotope ratio mass spectrometry," Anal. Bioanal. Chem., 384, 237-243, 2006.

Morrison et al., "On-Line High-Precision Stable Hydrogen Isotopic Analyses on Nanoliter Water Samples," Anal. Chem., 73, 3570-3575, 2001.

Kelly et al., "Deuterium/hydrogen isotope ratio measurement of water and organic samples by continuous-flow isotope ratio mass spectrometry using chromium as the reducing agent in an elemental analyser" Rapid Communications in Mass Spectrometry, vol. 15, pp. 1283-1286, 2001.

Gehre et al. "Continuous flow 2H/1H and 18O/16O analysis of water samples with dual inlet precision" Rapid Communications in Mass Spectrometry, vol. 18, pp. 2650-2660, 2004.

Office action dated Nov. 4, 2019, to CN Patent Application No. 201680010004.5.

* cited by examiner

USE OF A REACTOR, METHODS, AND DEVICE FOR QUANTITATIVELY OBTAINING MOLECULAR HYDROGEN FROM SUBSTANCES

CROSS-REFERENCE TO RELATED APPLICATION

This application is a U.S. National-Stage entry under 35 U.S.C. § 371 of PCT Patent Application No. PCT/EP2016/052902, filed Feb. 11, 2016, and claims the benefit of German Patent Application No. 102015102126.9, filed Feb. 13, 2015, and of German Patent Application No. 102015102710.0, filed Feb. 25, 2015, which are all hereby incorporated in their entirety by reference.

FIELD OF THE INVENTION

The invention relates to the use of a reactor, methods, and devices for the quantitative recovery of molecular hydrogen from solid, liquid, or gaseous substances which contain hydrogen and which have heteroatoms, as well as reactors for this purpose. In this case, the reactors have material containing chromium.

BACKGROUND OF THE INVENTION

Online methods are known for measuring isotope ratios of elements such as hydrogen, carbon, nitrogen, and oxygen. In this case, component-specific analyses can also be performed—particularly if a chromatographic separation has previously been used for the substance being investigated. Hydrogen (H2) can be analyzed, on the one hand, by direct elemental analysis. On the other hand, the sample containing hydrogen, or the components of the sample containing hydrogen, can be analyzed by pyrolysis to H2, with subsequent stable isotope ratio mass spectrometry, using mass spectrometers, particularly mass spectrometers for determining isotope ratios (IRMS) such as DI-IRMS (dual-inlet isotope ratio mass spectrometers) or CF-IRMS (continuous flow isotope ratio mass spectrometers).

Conventional elemental analyzers (EA) with high-temperature conversion (HTC) particularly allow the advantageous online- and/or continuous flow analysis of oxygen and hydrogen isotope ratios. The systems use pyrolysis to convert oxygen to CO and hydrogen to H2. The gases are then separated by isothermic gas chromatography and measured against a reference gas.

The high-temperature conversion is a pyrolysis process in which the pyrolysis leads to a complete conversion of the material being pyrolyzed. As such, the high-temperature conversion ensures that there is no longer any residue of the starting material following the conversion of the starting material by the pyrolysis. In particular, during a subsequent elemental analysis, for example by means of mass spectrometry, this is important to allow unbiased conclusions regarding the starting material being investigated.

Conventional GC/C (gas chromatography with subsequent combustion), and particularly GC/HTC (gas chromatography with subsequent high-temperature conversion) likewise particularly enables the advantageous determination of carbon- and hydrogen isotope ratios in continuous flow online analysis. The systems use the "on the fly" oxidation and pyrolysis reaction to convert carbon to CO2 and/or CO and hydrogen to H2. The isotope ratios of the gases (CO2, CO, or H2) are measured against corresponding reference gases.

Rapid. Comm. Mass. Spectrom. 2004; 18: 2650-2660 by Matthias Gehre et al. describes the online continuous flow analysis of oxygen- and hydrogen isotope ratios of water samples, by means of DI-IRMS, for example using a double-walled reactor with a glassy carbon fill. Double-walled pyrolysis reactors are also known from DE 198 16 348 C1, for online mass spectrometric determination of oxygen isotope compositions.

Two standard methods exist for measuring the component-specific isotope ratio of hydrogen. One of these uses an empty ceramic reactor and pyrolysis of the samples to H2, at a temperature of 1400-1450° C. The second method uses a quartz reactor filled with chromium powder, at a temperature of 800-1000° C. The latter design was patented in 1994 by the Micromass Ltd. corp. (Philip Antony Freedman, Timothy Graham Brockwell) (EP 0 729 577 A1). The reactor has an inner diameter of 0.5 mm. The literature also includes, by way of example, chromium reactors for the measurement of isotope ratios of hydrogen in polyhalogenated compounds (Wolfgang Armbruster et al, Anal. Bioana. Chem (2006) 384: 237-243). These reactors can be used for pyrolysis at 800 to 1050° C. Both methods are problematic because compounds which have heteroatoms (N, S, Cl, Br, I, P, F, etc.) do not allow a full hydrogen yield (approx. 60-80%), instead forming chemical hydrogenous byproducts at these temperatures. This is particularly true for starting substances containing nitrogen and halogens. They form byproducts such as HCN and HX (e.g. HCl) in the conditions of the elemental analyzers with high-temperature conversion (e.g. TC/EA from the Thermo Fisher Scientific company (Bremen)) and in HTC systems, and can lead to isotope fractionation—that is, a change in the frequency of the isotopes in the resulting molecular hydrogen compared to the hydrogen in the substance being investigated. Accordingly, the hydrogen yield drops significantly below 100%. Scientific publications which refer to EP 0 729 577 A1 demonstrate the efficacy of the approach of the second method for selected compounds within the described temperature range (800-1000° C.), with a corresponding limitation within the described temperature range (inter alia, Kuder, T.; Philp, P., Demonstration of compound-specific isotope analysis of hydrogen isotope ratios in chlorinated ethenes. Environ Sci Technol 2013, 47, (3), 1461-7; Shouakar-Stash, O.; Drimmie, R. J., Online methodology for determining compound-specific hydrogen stable isotope ratios of trichloroethene and 1,2-cis-dichloroethene by continuous-flow isotope ratio mass spectrometry. Rapid communications in mass spectrometry: RCM 2013, 27, (12), 1335-44).

The problem addressed by the invention is therefore that of finding effective methods and means which produce an essentially 100% recovery of molecular hydrogen, and which enable an efficient, precise elemental analysis and measurement of the isotope ratio of hydrogen (δ2H).

The invention also addresses the problem of finding effective methods and means for GC/HTC systems (gas chromatography with subsequent high-temperature conversion) which produce an essentially 100% recovery of molecular hydrogen, and enable the subsequent, precise component- and compound-specific measurement of the isotope ratio of hydrogen (δ2H).

SUMMARY OF THE INVENTION

It has been discovered that hot chromium (≥1100° C.) significantly increases the yield of molecular hydrogen during the pyrolytic reaction of solid, liquid, and gaseous compounds containing hydrogen, and having heteroatoms, and delivers nearly a 100% yield, wherein reactive elements, with the exception of hydrogen, are irreversibly and quantitatively removed. All elements which are ready to enter a reaction with other likewise reactive elements are included in the meaning of reactive elements.

The invention relates to the use of a reactor, methods, and devices for the quantitative recovery of molecular hydrogen from solid, liquid, or gaseous substances which contain hydrogen and which have heteroatoms, as well as reactors for this purpose. In this case, the reactors have material containing chromium. The material containing chromium can be a packing containing chromium. The reactors are preferably resistant to heat. Solid substances can first be dissolved with solvents for the recovery of the molecular hydrogen from the same. They can first be fed to a gas chromatography separation. The process for recovering molecular hydrogen from solid, liquid, or gaseous substances which contain hydrogen and which have heteroatoms can be carried out in low-flow systems. In this case, the reactor is operated at low gas flow, by way of example only 0.5 mL/min to 10 mL/min. Gas flows at this low level are particularly used if gas chromatography is also used in the process for the recovery of the molecular hydrogen. The subject matter of the present invention also includes the use of the reactor, the method, and the device for measuring the hydrogen isotope ratio ($\delta^2H$) of the substance from which the molecular hydrogen has been recovered. The measurement can be carried out by means of online apparatuses for elemental analysis (EA), online apparatuses for high-temperature conversion (in HTC systems), and online elemental analyzers with high-temperature conversion (HTC/EA). A component-specific and compound-specific measurement can be carried out by means of online apparatuses for high-temperature conversion (in HTC systems) following (gas-) chromatographic separation.

The subject matter of the invention is therefore the use of reactors with material containing chromium for the quantitative recovery of molecular hydrogen from solid, liquid, or gaseous substances which have heteroatoms, by pyrolysis. In this case, a zone with temperatures above 1100° C. is generated in the reactor to pyrolyze the substances. A reactive chromium layer of the reactor's material containing chromium, said chromium layer being accessible to the substances for the pyrolysis process, is at least partially arranged in this zone with temperatures above 1100° C.

The reactor, the inventive use of which is claimed in this invention, preferably has a reaction chamber with material containing chromium. Such a reactor chamber has an inlet for the substance being pyrolyzed, from which molecular hydrogen will be recovered. The reactor chamber also has a reactor outlet, wherein the formed hydrogen gas can exit from the same. The reactor chamber can be designed as a reactor tube. In a reactor tube, the inlet for the substance being pyrolyzed, and the reactor outlet from which the formed hydrogen gas can exit, are positioned at opposite ends of the reactor tube. The longitudinal axis of the reactor tube accordingly extends between the inlet for the substance being pyrolyzed, and the reactor outlet from which the formed hydrogen gas can exit. A reactor tube generally has its greatest length measurement in the direction of its longitudinal axis.

In one embodiment, the reactor, the inventive use of which is claimed in this invention, has at least one reactor tube. In this case, the reactor chamber of the reactor can be designed as a reactor tube.

In one embodiment of the use of a reactor according to the invention, the substances are pyrolyzed with the use of a carrier gas. The carrier gas is preferably an inert carrier gas, particularly a noble gas. It is particularly preferred that helium is used as the carrier gas.

The material containing chromium can be present in various forms in the reactor which has material containing chromium.

A first form is, by way of example, that the reactor has a filling containing chromium. This filling is then positioned in the interior of the reactor. The filling containing chromium can particularly be a packing containing chromium. The material containing chromium in this case can be previously packed into the reactor together with additional materials. Such a packing containing chromium is particularly used in reactors with a reactor tube in which the packing containing chromium is arranged. In this case, the material containing chromium can be arranged in the longitudinal direction, or perpendicular to the longitudinal direction of the reactor tube. The additional materials, which have been packed into the reactor tube and which can also include additional material containing chromium, can also be arranged in the longitudinal direction or perpendicular to the longitudinal direction of the reactor tube. The material containing chromium, and the other packed materials, are preferably packed in the same direction, at least in a subregion of the reactor tube, in the direction of the longitudinal axis. In one preferred embodiment, both the packing containing chromium and the additional materials are arranged perpendicular to the longitudinal direction in the entire reactor tube. Additional ways in which a filling containing chromium can be introduced into the interior of the reactor are, by way of example, pouring, injecting, laminating, and pressing.

A second form in which the material containing chromium can be present in the reactor which has material containing chromium is, by way of example, that at least one section of the inner reactor wall has a coating containing chromium. In a reactor tube, an inner reactor wall can have a coating in the longitudinal direction of the reactor tube which can, by way of example, be present over the entire circumference of the tube. Likewise, the coating can also be present only over segments of the tube circumference, preferably distributed evenly.

A third way in which the material containing chromium can be present in the reactor which has material containing chromium is, by way of example, that at least one section of a reactor wall consists of material containing chromium, at least on its inner side. The section of the reactor wall can consist entirely of the material containing chromium. In a reactor tube, an inner reactor wall can consist of material containing chromium in the longitudinal direction of the reactor tube, over a certain length, and the material containing chromium can be present over the entire circumference of the tube. Likewise, the material containing chromium can also be present only over segments of the tube circumference, preferably distributed evenly.

A fourth way in which the material containing chromium can be present in the reactor which has material containing chromium is, by way of example, that a material containing chromium is embedded in at least one section of a reactor wall, at least on its inner side. In this case it is important that embedded material containing chromium is embedded in the inner side of the reactor wall in such a manner that at least a reactive chromium layer of the material containing chromium projects out of the reactor wall in such a manner that it is accessible in the reactor interior for the pyrolysis process of the substances from which the molecular hydrogen will be recovered, and can take part in this process. The material containing chromium can be, by way of example, cast into the material of the reactor wall, made of quartz or a ceramic, for example, and constructed in this case as a plating or wire, for example. The material containing chromium in this case can project out of the reactor wall into the interior of the reactor and thereby take part in the pyrolysis process at least via its surface which is enlarged in this manner.

In one embodiment of the use of a reactor according to the invention, the reactor's material containing chromium consists of pure chromium.

In one preferred embodiment of the use of a reactor according to the invention, the pure chromium consists of chromium powder or chromium granulate.

In another embodiment of the use of a reactor according to the invention, the reactor's material containing chromium consists of chromium and other heat-stable materials which do not contain any hydrogen and/or do not react with molecular hydrogen above 1100° C. In one embodiment, these heat-resistant materials do not contain any silicon or Si compounds. This is particularly advantageous in the recovery of molecular hydrogen from substances containing halogen.

In another embodiment of the use of a reactor according to the invention, the reactor's material containing chromium consists of other heat-stable materials coated with chromium, which do not contain any hydrogen and/or do not react with molecular hydrogen above 1100° C.

In another embodiment of the use of a reactor according to the invention, the reactor's packing containing chromium consists of chromium and other heat-stable materials which are packed into the reactor in sections thereof, wherein the other heat-stable materials do not contain any hydrogen and/or do not react with molecular hydrogen above 1100° C.

In one preferred embodiment of the use of a reactor according to the invention, the chromium which is packed into the reactor in sections thereof is at least a layer of pure chromium.

In one embodiment of the use of a reactor according to the invention, the reactor's material containing chromium ensures a flow of carrier gas of up to 10 mL/min.

In a further embodiment of the use of a reactor according to the invention, the reactor's material containing chromium ensures a flow of carrier gas of up to 300 mL/min.

In a further embodiment of the use of a reactor according to the invention, the reactor's material containing chromium ensures a flow of carrier gas of up to 1000 mL/min.

In one embodiment of the use of a reactor according to the invention, the temperature in the zone with temperatures above 1100° C. is between 1100° C. and 1800° C. The temperature is preferably between 1200° C. and 1500° C., and particularly between 1250° C. and 1400° C.

In one embodiment of the use of a reactor according to the invention, the zone with temperatures above 1100° C. is only generated in a subvolume of the reactor which makes up at most 50% of the reactor volume. In another embodiment, the subvolume makes up at most 70% of the reactor volume. In a further embodiment, it makes up at most 30% of the reactor volume.

In one embodiment of the use of a reactor according to the invention, the zone with temperatures above 1100° C. includes the center of the at least one reactor tube in the direction of its longitudinal axis.

In one embodiment of the use of a reactor according to the invention, the zone with temperatures above 1100° C. extends in the direction of the longitudinal axis of the reactor tube, over at most 50% of the length of the reactor tube. In a further embodiment the zone with temperatures above 1100° C. extends in the direction of the longitudinal axis of the reactor tube over at most 70% of the length of the reactor tube. In a further embodiment the zone with temperatures above 1100° C. extends in the direction of the longitudinal axis of the reactor tube over at most 30% of the length of the reactor tube.

In one embodiment of the use of a reactor according to the invention, the reactor's material containing chromium is present in 25% to 95% of the zone with temperatures above 1100° C. In one preferred embodiment, the reactor's material containing chromium is present in 35% to 90% of the zone with temperatures above 1100° C. In one particularly preferred embodiment, the reactor's material containing chromium is present in 40% to 60% of the zone with temperatures above 1100° C.

In one embodiment of the use of a reactor according to the invention, the reactor's material containing chromium extends over 30% to 70% of the length of the zone with temperatures above 1100° C. in the longitudinal direction of the reactor tube. In one preferred embodiment of the use of a reactor according to the invention, the reactor's material containing chromium extends over 40% to 60% of the length of the zone with temperatures above 1100° C. in the longitudinal direction of the reactor tube.

In one embodiment of the use of a reactor according to the invention, the longitudinal axis of the reactor tube is oriented vertically, and the reactor tube's material containing chromium is present as a layer constructed horizontally.

In one embodiment of the use of a reactor according to the invention, the reactor tube's material containing chromium extends over the 40% to 60% of the length of the zone with temperatures above 1100° C. in the longitudinal direction of the reactor tube which is arranged toward the outlet of the reactor tube. In another embodiment of the use of a reactor according to the invention, the reactor tube's material containing chromium extends over the 30% to 80% of the length of the zone with temperatures above 1100° C. in the longitudinal direction of the reactor tube which is arranged toward the outlet of the reactor tube.

In one embodiment of the use of a reactor according to the invention, heat-stable materials packed intermittently are arranged between the reactor chamber's material containing chromium and the outlet of the reactor chamber, and do not contain any hydrogen and/or do not react with molecular hydrogen at temperatures≥1100° C.

In one embodiment of the use of a reactor according to the invention, further reactor chamber material containing chromium is arranged between the reactor chamber material containing chromium, the same positioned during pyrolysis in the zone with temperatures above 1100° C., and the outlet of the reactor chamber, said further reactor chamber material containing chromium being arranged in a temperature zone which adjoins the zone with temperatures above 1100° C. and in which the temperature drops to a temperature of 500° C., preferably 300° C., and particularly preferably 180° C. with increasing proximity to the outlet of the reactor chamber. In particular, the temperature in this case can fall evenly inside the zone. Likewise, the temperature can fall more sharply with lower temperatures. The material containing chromium in both temperature zones can particularly be the same material containing chromium. The same is particularly designed as a single, one-piece component of the reactor chamber. The zone in which the temperature falls further from 1100° C. preferably has smaller dimensions than the zone with the temperatures above 1100° C. In particular, the dimensions of both zones can be selected such that the substance being pyrolyzed and the resulting pyrolysis product remain for less time in the zone of the reactor chamber in which the temperature drops from 1100° C. than in the zone with temperatures above 1100° C. In particular, the dwell time in the zone of the reactor chamber in which the temperature drops from 1100° C. can be only 50% to 70% of the dwell time in the zone with temperatures above 1100° C.

In one preferred embodiment of the use of a reactor according to the invention, further reactor tube material containing chromium is arranged between the reactor tube material containing chromium, the same positioned during pyrolysis in the zone with temperatures above 1100° C., and the outlet of the reactor tube, said further reactor chamber material containing chromium being arranged in a temperature zone which adjoins the zone with temperatures above 1100° C. and in which the temperature drops to a temperature of 500° C., preferably 300° C., and particularly preferably 180° C. with increasing proximity to the outlet of the reactor tube. In particular, the temperature in this case can fall evenly inside the zone. Likewise, the temperature can fall more sharply with lower temperatures. The material containing chromium in both temperature zones can particularly be the same material containing chromium. The same is particularly designed as a single, one-piece component of the reactor tube. The zone in which the temperature falls further from 1100° C. is preferably shorter in the longitudinal direction of the reactor tube than the zone with the temperatures above 1100° C. The zone in which the temperature further falls from 1100° C. can have a length in the longitudinal direction of the reactor tube which is between 40% and 100% of the length of the zone with temperatures above 1100° C. in the longitudinal direction of the reactor tube. The zone in which the temperature falls further from 1100° C. can particularly have a length in the longitudinal direction of the reactor tube which is between 50% and 85% of the length of the zone with temperatures above 1100° C. in the longitudinal direction of the reactor tube. The zone in which the temperature falls further from 1100° C. can preferably have a length in the longitudinal direction of the reactor tube which is between 60% and 75% of the length of the zone with temperatures above 1100° C. in the longitudinal direction of the reactor tube.

In one embodiment of the use of a reactor according to the invention, the zone with temperatures above 1100° C., generated in the reactor, makes up at least 70% of the reactor volume. In one preferred embodiment of the use of a reactor according to the invention, the zone with temperatures above 1100° C., generated in the reactor, makes up at least 90% of the reactor volume. In one particularly preferred embodiment of the use of a reactor according to the invention, the zone with temperatures above 1100° C., generated in the reactor, makes up at least 95% of the reactor volume.

In one embodiment of the use of a reactor according to the invention, the zone with temperatures above 1100° C. extends in the direction of the longitudinal axis of the reactor tube, over at least 80% of the length of the reactor tube. In one preferred embodiment of the use of a reactor according to the invention, the zone with temperatures above 1100° C. extends in the direction of the longitudinal axis of the reactor tube, over at least 90% of the length of the reactor tube. In one preferred embodiment of the use of a reactor according to the invention, the zone with temperatures above 1100° C. extends in the direction of the longitudinal axis of the reactor tube, over at least 95% of the length of the reactor tube.

In one embodiment of the use of a reactor according to the invention, further reactor chamber material containing chromium is arranged between the reactor chamber material containing chromium, the same positioned during pyrolysis in the zone with temperatures above 1100° C., and the inlet of the reactor chamber. This material containing chromium is preferably arranged in a temperature zone which adjoins the zone with temperatures above 1100° C. and in which the temperature drops to a temperature of 500° C., preferably 300° C., and particularly preferably 180° C. with increasing proximity to the inlet of the reactor chamber. In particular, the temperature in this case can fall evenly inside the zone. Likewise, the temperature can fall more sharply with lower temperatures. The material containing chromium in both temperature zones can particularly be the same material containing chromium. The same is particularly designed as a single, one-piece component of the reactor chamber. The zone in which the temperature rises to 1100° C. preferably has significantly smaller dimensions than the zone with the temperatures above 1100° C. In particular, the dimensions of both zones can be selected such that the substances being pyrolyzed remain for less time in the zone of the reactor chamber in which the temperature increases to 1100° C. than in the zone with temperatures above 1100° C. In particular, the dwell time in the zone of the reactor chamber in which the temperature increases to 1100° C. can be only 10% to 30% of the dwell time in the zone with temperatures above 1100° C.

In one preferred embodiment of the use of a reactor according to the invention, further reactor tube material containing chromium is arranged between the reactor tube material containing chromium, the same positioned during pyrolysis in the zone with temperatures above 1100° C., and the inlet of the reactor tube, said further reactor chamber material containing chromium being arranged in a temperature zone which adjoins the zone with temperatures above 1100° C. and in which the temperature drops to a temperature of 500° C., preferably 300° C., and particularly preferably 180° C. with increasing proximity to the inlet of the reactor tube. In particular, the temperature in this case can fall evenly inside the zone. Likewise, the temperature can fall more sharply with lower temperatures. The material containing chromium in both temperature zones can particularly be the same material containing chromium. The same is particularly designed as a single, one-piece component of the reactor tube. The zone in which the temperature rises to 1100° C. is preferably shorter in the longitudinal direction than the zone with the temperatures above 1100° C. The zone in which the temperature rises to 1100° C. can have a length in the longitudinal direction of the reactor tube which is between 5% and 30% of the length of the zone with temperatures above 1100° C. in the longitudinal direction of the reactor tube. The zone in which the temperature rises to 1100° C. can particularly have a length in the longitudinal direction of the reactor tube which is between 10% and 20% of the length of the zone with temperatures above 1100° C. in the longitudinal direction of the reactor tube.

In one embodiment of the use of a reactor according to the invention, the reactor tube's material containing chromium is arranged at least over the length of the zone with temperatures above 1100° C.

In one embodiment of the use of a reactor according to the invention, the reactor tube's material containing chromium is arranged over the length of the reactor tube, including two barrier layers at the inlet and outlet of the reactor tube.

In one embodiment of the use of a reactor according to the invention, the reactor tube's material containing chromium is arranged over the length of the reactor tube.

In one embodiment of the use of a reactor according to the invention, silver wool is arranged in a first region of the reactor, as a halogen trap, where there is a temperature zone between 500° C. and 800° C. during pyrolysis due to the temperature zone above 1100° C.

In one embodiment of the use of a reactor according to the invention, the reactor is positioned in an apparatus for high-temperature conversion (in HTC systems).

In one embodiment of the use of a reactor according to the invention, the reactor is in an apparatus for elemental analysis. In one preferred embodiment, a high-temperature conversion takes place in the apparatus.

In one embodiment of the use of a reactor according to the invention, the solid, liquid, or solid substances from which the molecular hydrogen will be recovered are separated into their components prior to entry into the reactor by means of gas chromatography.

In one preferred embodiment of the use of a reactor according to the invention, the reactor is made at least partially of heat-resistant materials suitable for pyrolysis of inserted substances at temperatures≥1100° C., which do not allow the passage of molecular hydrogen from the inside or of air from the outside. In one embodiment, these heat-resistant materials do not contain any silicon or Si compounds. This is particularly advantageous in the recovery of molecular hydrogen from substances containing halogen.

In one embodiment of the use of a reactor according to the invention, the reactor has an outer reactor tube and an inner reactor tube with material containing chromium. The outer reactor tube is at least partially made of one or more heat-resistant materials. The inner reactor tube is at least partially made of heat-resistant materials suitable for pyrolysis of inserted substances at temperatures≥1100° C., does not allow the passage of hydrogen, contains no hydrogen, does not react with hydrogen, and is centered inside the outer reactor tube in such a manner that it does not contact the outer tube.

In one preferred embodiment of the use of a reactor according to the invention, the dimensions of the reactor material containing chromium relative to the other dimensions of the reactor are selected such that the recovery of molecular hydrogen during the pyrolysis of the substances is completed in the zone with temperatures above 1100° C. If the pyrolysis is carried out using a carrier gas in a reactor tube, by way of example, the material containing chromium must then be arranged in the reactor tube in such a manner that the recovery of molecular hydrogen is completed when the carrier gas leaves the zone with temperatures above 1100° C. along with the pyrolysis products. In particular, the length of the material containing chromium in the longitudinal direction of the reactor tube in this case must be selected such that during the pyrolysis it is possible to completely recover the hydrogen from the substance being investigated—that is, there is enough time when the carrier gas containing the substance flows past the material containing chromium for the hydrogen contained in the substance to be converted into molecular hydrogen.

The subject matter of the invention is furthermore a method for the quantitative recovery of molecular hydrogen from solid, liquid, and gaseous substances containing hydrogen and having heteroatoms. The method uses pyrolysis reactors with material containing chromium. The method is characterized in that, for the pyrolysis of the substances being analyzed, a zone with temperatures above 1100° C. is generated in the pyrolysis reactor, and a reactive chromium layer of the material containing chromium of the pyrolysis reactor is at least partially arranged in this zone.

In one embodiment of the method according to the invention, the zone with temperatures above 1100° C. is only generated in a subvolume of the reactor which makes up at most 50% of the reactor volume.

In one embodiment of the method according to the invention, the zone with temperatures above 1100° C. is only generated in a subvolume of the reactor which makes up at most 70% of the reactor volume.

In one embodiment of the method according to the invention, the zone with temperatures above 1100° C. extends in the direction of the longitudinal axis of the reactor tube, over at least 90% of the length of the reactor tube. In this case, the reactor tube's material containing chromium is preferably arranged in the reactor tube at least over the length of the zone with temperatures above 1100° C.

In one embodiment of the method according to the invention, the method uses heat-resistant pyrolysis reactors.

In one embodiment of the method according to the invention, the pyrolysis is carried out with the use of a carrier gas, preferably helium.

In one embodiment of the method according to the invention, a packing containing chromium is arranged in the pyrolysis reactor, and the reactive chromium layer in the packing containing chromium is arranged in the reactor tube at least partially in the zone with temperatures above 1100° C.

In another embodiment of the method according to the invention, the packing containing chromium is arranged in the pyrolysis reactor entirely in the zone with temperatures above 1100° C.

During the pyrolysis, the temperature in the zone with temperatures above 1100° C. is preferably between 1100° C. and 1800° C. A carrier gas can flow into the reactor along with the substances being analyzed. In this case, chromium reacts with the heteroatoms of the substances being analyzed or mixtures containing the same. At the reactor outlet, the carrier gas flows out, carrying the molecular hydrogen gas at nearly 100%.

As is known, the heteroatoms include phosphorous, nitrogen, oxygen, and sulfur atoms, as well as halogens such as fluorine, chlorine, bromine, and iodine. In particular, "heteroatom" is a general term for atoms in an organic compound which are not carbon or hydrogen. As such, essentially all organic compounds aside from hydrocarbons have heteroatoms.

The zone with temperatures above 1100° C. is preferably generated in the reactor in such a manner that it is positioned approximately in the center of the reactor. For the preferred method design, the reactor material containing chromium, preferably in the form of a packing containing chromium, designed as a horizontal layer, is arranged approximately over half of the zone with temperatures above 1100° C. in the reactor tube and up to the outlet of the reactor tube where a carrier gas with the molecular hydrogen can flow out. The reactor tube's material containing chromium preferably extends over the 30% to 70% of the length of the zone with temperatures above 1100° C. in the longitudinal direction of the reactor tube which is arranged toward the outlet of the reactor tube. It is particularly preferred that the reactor tube's material containing chromium extends over the 40% to 60% of the length of the zone with temperatures above 1100° C. in the longitudinal direction of the reactor tube which is arranged toward the outlet of the reactor tube. It is most particularly preferred that the reactor tube's material containing chromium extends over the 45% to 55% of the length of the zone with temperatures above 1100° C. in the longitudinal direction of the reactor tube which is arranged toward the outlet of the reactor tube.

In one preferred embodiment of the method according to the invention, further reactor tube material containing chromium is arranged between the reactor tube's material containing chromium, the same positioned during pyrolysis in the zone with temperatures above 1100° C., and the outlet of the reactor tube, said further reactor tube material containing chromium being arranged in a zone which adjoins the zone with temperatures above 1100° C., and in this zone, the temperature drops during the pyrolysis to a temperature of 500° C., preferably 300° C., and particularly preferably 180° C. with increasing proximity to the outlet of the reactor tube. In particular, the temperature in this case can fall evenly inside the zone. Likewise, the temperature can fall more sharply with lower temperatures. The material containing chromium in both temperature zones can particularly be the same material containing chromium. The same is particularly designed as a single, one-piece component of the reactor tube. The zone in which the temperature falls further from 1100° C. is preferably shorter in the longitudinal direction of the reactor tube than the zone with the temperatures above 1100° C. The zone in which the temperature further falls from 1100° C. can have a length in the longitudinal direction of the reactor tube which is between 40% and 100% of the length of the zone with temperatures above 1100° C. in the longitudinal direction of the reactor tube. The zone in which the temperature falls further from 1100° C. can particularly have a length in the longitudinal direction of the reactor tube which is between 50% and 85% of the length of the zone with temperatures above 1100° C. in the longitudinal direction of the reactor tube. The zone in which the temperature falls further from 1100° C. can preferably have a length in the longitudinal direction of the reactor tube which is between 60% and 75% of the length of the zone with temperatures above 1100° C. in the longitudinal direction of the reactor tube.

In one preferred embodiment of the method according to the invention, further reactor tube material containing chromium is arranged between the reactor tube's material containing chromium, the same positioned during pyrolysis in the zone with temperatures above 1100° C., and the inlet of the reactor tube, wherein during the pyrolysis, in a zone which adjoins the zone with temperatures above 1100° C., the temperature drops to a temperature of 500° C., preferably 300° C., and particularly preferably 180° C. with increasing proximity to the inlet of the reactor tube. In particular, the temperature in this case can fall evenly inside the zone. Likewise, the temperature can fall more sharply with lower temperatures. The material containing chromium in both temperature zones can particularly be the same material containing chromium. The same is particularly designed as a single, one-piece component of the reactor tube. The zone in which the temperature rises to 1100° C. is preferably shorter in the longitudinal direction than the zone with the temperatures above 1100° C. The zone in which the temperature rises to 1100° C. can have a length in the longitudinal direction of the reactor tube which is between 5% and 30% of the length of the zone with temperatures above 1100° C. in the longitudinal direction of the reactor tube. The zone in which the temperature rises to 1100° C. can particularly have a length in the longitudinal direction of the reactor tube which is between 10% and 20% of the length of the zone with temperatures above 1100° C. in the longitudinal direction of the reactor tube.

The reactors material containing chromium can be designed as a vertical or horizontal layer, particularly if the reactor is a reactor chamber or even a reactor tube. If the longitudinal axis is oriented vertically, the reactors material containing chromium is preferably designed as a horizontal layer. This is particularly advantageous if the substances being analyzed are dropped into the reactor tube as a result of the melting of the silver or zinc capsules which contain them, and fall onto the horizontal layer of the material containing chromium.

In one preferred embodiment of the method according to the invention, in a reactor having a reactor tube with material containing chromium, the reactor tube's material containing chromium is arranged over the entire length of the reactor tube in the direction of its longitudinal axis. The reactors material containing chromium can particularly be a packing containing chromium.

In another preferred embodiment of the method and of the use of the reactor, the reactor tube's material containing chromium is arranged in the reactor tube at least over the length of the zone with temperatures above 1100° C. in the longitudinal direction of the reactor tube.

The packing containing chromium can contain a pure chromium layer of chromium powder and/or chromium granulate. As an alternative, a mixture of a chromium layer and other heat-stable materials is used as the material containing chromium, the same not containing any hydrogen and/or not reacting with molecular hydrogen at temperatures above 1100° C. However, the material containing chromium can also be a packing containing chromium, present as a mixture of chromium and other heat-stable materials packed in sections in the reactor. The chromium layer exclusively can be present at least partially in the zone with temperatures of 1100° C. to 1800° C. as a chromium powder and/or chromium granulate. In particular, the chromium layer exclusively can be present in the zone with temperatures of 1100° C. to 1800° C. as a chromium powder and/or chromium granulate.

In a reactor with a reactor tube, a barrier layer is advantageously positioned in the reactor tube as a (cold) reactor closure at the reactor outlet, preferably made of quartz wool, and having the function of fixing the position of the reactors material containing chromium, preferably as reactor packing, and securing the same against slipping.

Preferably, a pure chromium layer in the zone with temperatures above 1100° C. is made of a chromium powder/granulate of 0.05 mm to 10.0 mm in diameter, particularly preferably a chromium powder/granulate of 0.1 mm to 5.0 mm in diameter, and most preferably a chromium powder/granulate of 0.3 mm to 3.0 mm in diameter Pure chromium in this case means that the chromium only contains other elements to the extent that they are present following a production process in which only chromium is produced.

This composition can enable a flow of carrier gas of 0.1 mL/min to 1000 mL/min through the pure chromium layer, which can also be, inter alia, a packing containing chromium. The composition is preferably selected in such a manner that a carrier gas flow of 0.2 mL/min to 500 mL/min is possible. It is particularly preferred that the composition is selected in such a manner that a carrier gas flow of 0.4 mL/min to 300 mL/min is possible. The composition is particularly selected in such a manner that a carrier gas flow of 10 mL/min to 250 mL/min is possible.

If the solid, liquid, or gaseous substances from which the molecular hydrogen is recovered are divided into their components by means of gas chromatography before entry into the reactor, the composition of the pure chromium layer is also preferably selected in such a manner that a carrier gas flow of 0.2 mL/min to 10 mL/min is possible. It is particularly preferred in this case that the composition of the pure chromium layer is selected in such a manner that a carrier gas flow of 0.4 mL/min to 5 mL/min is possible. It is most particularly preferred in this case that the composition of the pure chromium layer is selected in such a manner that a carrier gas flow of 1 mL/min to 3 mL/min is possible.

In addition to chromium, the reactor's material containing chromium—and particularly a packing containing chromium of the reactor—preferably has additional heat-resistant materials. These include crushed quartz, crushed glassy carbon, crushed ceramic, and/or other heat-resistant materials which do not react with hydrogen, as well as quartz wool, packed sectionally, by way of example, below the chromium layer in the first region of the reactor tube and/or included in the layer containing chromium. These materials primarily serve to reduce the dead volume and to position the material containing chromium in the hot zone with temperatures above 1100° C.

In this case, the reactive chromium layer is advantageously arranged in such a manner that it is partially or completely in the hot zone with temperatures above 1100° C. The temperatures in the reactor below the hot zone with temperatures above 1100° C., up to the reactor outlet, naturally fall. The layers are preferably packed in stages. A packing of quartz wool preferably adjoins a layer containing chromium, followed by a layer of chippings (quartz, ceramic, and/or glassy carbon). The temperatures of the separating layer and the chips are limited by the melting point of the materials. For quartz, this is approx. 1700° C. The closure, as already noted, forms a barrier layer, preferably of quartz wool.

In a reactor chamber, such as, preferably, a reactor tube, a barrier layer is advantageously positioned at both ends of the material containing chromium formed as a packing containing chromium, preferably made of quartz wool, having the function of fixing the position of the reactors material containing chromium and/or the packing containing chromium, and securing the same against slipping. If quartz is used, a temperature below the melting point thereof must be ensured at the corresponding position.

In one preferred variant, for the method according to the invention, silver wool can also be integrated into the packing as an additional layer in the first region of the reactor, in the temperature zone between 500° C. and 800° C., functioning as an additional halogen trap (for F, Cl, Br, I).

The subject matter of the invention is also a pyrolysis reactor for carrying out the method for the quantitative recovery of molecular hydrogen from solid, liquid, and gaseous substances containing hydrogen and having heteroatoms. The pyrolysis reactor has pure chromium as the material, consisting of chromium powder or chromium granulate with a diameter of 0.05 mm to 5.0 mm.

The subject matter of the invention is also a pyrolysis reactor for carrying out the method for the quantitative recovery of molecular hydrogen from solid, liquid, and gaseous substances containing hydrogen and having heteroatoms. The pyrolysis reactor has pure chromium as the material, ensuring a flow of carrier gas of up to 10 mL/min.

The subject matter of the invention is also a pyrolysis reactor for carrying out the method for the quantitative recovery of molecular hydrogen from solid, liquid, and gaseous substances containing hydrogen and having heteroatoms. The pyrolysis reactor has pure chromium as the material, ensuring a flow of carrier gas of up to 300 mL/min.

The subject matter of the invention is also a pyrolysis reactor for carrying out the method for the quantitative recovery of molecular hydrogen from solid, liquid, and gaseous substances containing hydrogen and having heteroatoms. The pyrolysis reactor has pure chromium as the material, ensuring a flow of carrier gas of up to 1000 mL/min.

The subject matter of the invention is also a pyrolysis reactor for carrying out the method for the quantitative recovery of molecular hydrogen from solid, liquid, and gaseous substances containing hydrogen and having heteroatoms. The pyrolysis reactor has material containing chromium which consists of chromium and other heat-stable materials not containing any hydrogen and/or not reacting with molecular hydrogen at temperatures above 1100° C. In one embodiment, these heat-resistant materials do not contain any silicon or Si compounds. This is particularly advantageous in the recovery of molecular hydrogen from substances containing halogen.

The subject matter of the invention is also a pyrolysis reactor for carrying out the method for the quantitative recovery of molecular hydrogen from solid, liquid, and gaseous substances containing hydrogen and having heteroatoms. The pyrolysis reactor has a packing containing chromium and other heat-stable materials which are packed into the reactor in sections thereof, wherein the other heat-stable materials do not contain any hydrogen and/or do not react with molecular hydrogen above 1100° C.

In one embodiment of the pyrolysis reactor according to the invention, the reactor is made at least partially of heat-resistant materials suitable for pyrolysis of inserted substances at temperatures≥1100° C., which do not allow the passage of molecular hydrogen from the inside or of air from the outside. In one embodiment, these heat-resistant materials do not contain any silicon or Si compounds. This is particularly advantageous in the recovery of molecular hydrogen from substances containing halogen.

In another embodiment of the pyrolysis reactors according to the invention, the pyrolysis reactor has an outer reactor tube and an inner reactor tube with material containing chromium, wherein the outer reactor tube is at least partially made of a heat-resistant material and the inner reactor tube is at least partially made of heat resistant materials suitable for pyrolysis of inserted substances at temperatures≥1100° C., does not allow the passage of hydrogen, contains no hydrogen, does not react with hydrogen, and is centered inside the outer reactor tube in such a manner that it does not contact the outer tube.

The reactor can be suitable for apparatuses for elemental analysis, such as elemental analyzers, and/or apparatuses for high-temperature conversion (in HTC systems) which achieve temperatures with their heaters of at least 1100° C. to 1800° C., and preferably temperatures between 1200° C. and 1500° C. In particular, the reactor can be used in apparatuses for elemental analysis in which there is a high-temperature conversion of the substance being analyzed. In particular, the reactor can be used in systems which additionally have a gas chromatography unit and/or an IRMS.

A reactor which can be used in the method according to the invention has material containing chromium with a reactive chromium layer of the material containing chromium in the interior, wherein the reactor is made at least partially of heat-resistant materials suitable for pyrolysis of inserted substances at temperatures above 1100° C., preferably of quartz, ceramic, $Al_2O_3$, and SiC, which do not allow the passage of molecular hydrogen from the inside or of air ($N_2$, $O_2$, Ar) from the outside. It can be configured with a filling containing chromium which, by way of example, can constitute a packing containing chromium, and which is suitable for reaction with the heteroatoms of the mixtures or substance being analyzed, containing hydrogen, at temperatures≥1100° C.

The reactor can have at least one reactor tube which comprises the reactors material containing chromium. The material containing chromium, particularly in the form of a filling containing chromium or a packing containing chromium, is designed in one embodiment as a layer, preferably oriented horizontally or vertically, in a reactor tube, arranged approximately over half of the length in the reactor tube up to the outlet of the reactor tube where the molecular hydrogen can flow out, preferably in a carrier gas.

In a further embodiment, the material containing chromium, particularly in the form of a filling containing chromium or a packing containing chromium, is filled into the reactor preferably over approximately the length of the reactor tube up to the outlet, including the two barrier layers (inlet, outlet), for the purpose of fixing the chromium layer. According to the system used, the reactor can be arranged horizontally or vertically, wherein the resulting molecular hydrogen flows out of the reactor outlet, preferably in a carrier gas.

A hot zone with temperatures above 1100° C. can be generated preferably approximately in the center of the height of the beginning of the material containing chromium in the interior of the reactor tube having the material containing chromium. The hot zone in this case preferably has temperatures of at least 1100° C. up to a maximum of 1800° C.

It is particularly preferred that the method according to the invention can be carried out in a reactor which has an outer heat-resistant reactor tube and an inner heat-resistant reactor tube, wherein the inner reactor tube which does not allow the passage of hydrogen, contains no hydrogen, and does not react with hydrogen, is centered inside the outer reactor tube in such a manner that it does not contact the outer tube, and the material containing chromium, for example in the form of a packing containing chromium, is positioned in the inner reactor tube.

Reactors used according to the invention contain material containing chromium, for example in the form of a packing containing chromium, as described above, and can be used particularly for online mass spectrometric determination of hydrogen isotope compositions.

As noted above, the other heat-stable materials in the material containing chromium, such as a packing containing chromium, are, by way of example, crushed quartz, crushed glassy carbon, crushed ceramic, and/or other heat-resistant materials which do not react with hydrogen, as well as optionally silver wool and quartz wool. These can be arranged in a reactor chamber, which is preferably designed as a reactor tube, after the material containing chromium—that is, in a region which pyrolysis products of the pyrolyzed substances only reach after contact with the reactive chromium layer of the reactors material containing chromium, said chromium layer being accessible to the substances for the pyrolysis process—packed sectionally in the first region of the reactor chamber, or can be arranged in the reactor's material containing chromium itself.

If the reactor tube is arranged vertically, the heat-stable materials in this case can be arranged below the material containing chromium, preferably packed sectionally in the first region of the reactor tube.

The chromium in the reactor's material containing chromium is preferably a chromium powder/granulate of 0.1 mm to 5.0 mm in diameter, at least in the region of the hot zone with temperatures above 1100° C., such that it is possible to generate a stable carrier gas flow of 10 mL/min to 250 mL/min.

The heat-resistant material of the reactor tube for pyrolysis can be made of ceramic materials, preferably $Al_2O_3$ and SiC, which can be used for temperatures up to 1800° C. It can also be made of glassy carbon, and then likewise be used for temperatures up to 1800° C. if air is excluded. In addition, reactor tubes made of metals or quartz can be used.

It is particularly preferred that double-walled reactor tubes, such as those described in DE 198 16 348 C1, are used according to the invention, wherein the outer reactor tube preferably is made of ceramic materials, and the inner reactor tube is made of glassy carbon, quartz, or ceramic—but preferably of quartz.

This has the great advantage that it is possible to reduce the inner diameter of the reaction zone for the measurement of the smallest amounts of samples. The known reverse flow system as described in Gehre et al. (see above) can also be used advantageously.

In one embodiment, the reactor, particularly a reactor tube of the reactor, has a preferred length of 300 to 600 mm, particularly 300 to 500 mm, wherein the outer diameter can be ¼ inch (635 mm), ⅛ inch (3.175 mm) or 1/16 inch (1.587 mm). The inner diameter is made such that a flow of a carrier gas of 0.4 mL/min to 10.0 mL/min, and preferably of 0.5 mL/min to 3 mL/min, is enabled. The inner diameter preferably has dimensions of 0.5 to 1 mm (for 1/16 inch) and/or 0.5 mm to 2 mm (for ⅛ inch and ¼ inch). It is particularly preferred that a reactor tube has the length of 320 mm, an outer diameter of 1/16 inch (1.587 mm) and an inner diameter of 0.5 to 1 mm. The reactor, particularly a reactor tube in the reactor, can be positioned horizontally or vertically.

The reactors material containing chromium, such as a packing containing chromium for example, has a length depending on the length of the reactor. However, it is preferably at least 5 mm long and has at most the length of the selected reactor system. Reactors for elemental analysis in an oven are known to have fillings with a length of approximately 220 mm; reactors for high-temperature conversion have a length of approximately 250 mm. In another embodiment which is preferably used if the solid, liquid, or gaseous substances from which the molecular hydrogen is recovered are divided into their components by means of gas chromatography before entry into the reactor, the reactors material containing chromium then preferably has a length of at least 150 mm, and has a length of at most the length of the selected reactor system. In particular, longer packings containing chromium can be used according to the size of the grains, but the packing must not be allowed to clog, and the clear flow must be ensured.

In one first preferred design given by way of example, the packing is present in a vertically oriented reactor, starting at the reactor end, as follows:

lower barrier layer, preferably made of quartz wool: 20 mm optional layer of silver wool: approx. 10 mm integrated into the hot zone in the layer of chippings chippings layer, preferably quartz: approx. 100 to 110 mm glass wool to separate the chromium layer: approx. 5 to 10 mm chromium layer made of powder/particles: approx. 80 to 85 mm optional layer of quartz wool to separate the chromium layer: approx. 3 to 5 mm.

In a second preferred embodiment, the packing is present in the reactor, starting at the reactor end, as follows:

barrier layer (outlet), preferably made of quartz wool: approx. 20 mm optional layer of silver wool: approx. 10 mm chromium layer made of powder/particles: approx. 240 mm barrier layer (inlet), preferably made of quartz wool: approx. 20 mm.

The subject matter of the invention is also a device for the quantitative recovery of molecular hydrogen from solid, liquid, or gaseous substances which have heteroatoms, by pyrolysis. The same includes a reactor with material containing chromium, and an oven in the interior of which it is possible to generate temperatures above 1100° C. The reactor with the material containing chromium is arranged in the interior of the oven in such a manner that, for pyrolysis of the substances, a zone with temperatures above 1100° C. can be generated in the reactor, wherein a reactive chromium layer of the reactor's material containing chromium, said chromium layer being accessible to the substances for the pyrolysis process, is arranged at least partially in said zone.

The device according to the invention can particularly include each embodiment of a reactor according to the invention.

In one embodiment of the device according to the invention, the device includes a reactor with material containing chromium, which has a reactor chamber with material containing chromium, designed as a reactor tube, wherein the longitudinal axis of the reactor tube is oriented vertically and the reactor tube's material containing chromium is present as a horizontal layer. The reactor tube's material containing chromium preferably extends over the 40% to 60% of the length of the generated zone with temperatures above 1100° C. in the longitudinal direction of the reactor tube which is arranged toward the outlet of the reactor tube.

In one preferred embodiment of the device according to the invention, further reactor tube material containing chromium is arranged between the reactor tube's material containing chromium, the same positioned during pyrolysis in the zone with temperatures above 1100° C., and the outlet of the reactor tube, said further reactor tube's material containing chromium being arranged in a zone which adjoins the zone with temperatures above 1100° C., and the oven of the device is operated in such a manner that in this zone the temperature drops during the pyrolysis to a temperature of 500° C., preferably 300° C., and particularly preferably 180° C. with increasing proximity to the outlet of the reactor tube. In particular, the oven of the device in this case can be operated in such a manner that the temperature drops evenly in the zone. Likewise, the oven of the device in this case can be operated in such a manner that the temperature drops more sharply with lower temperatures. The material containing chromium in both temperature zones can particularly be the same material containing chromium. The same is particularly designed as a single, one-piece component of the reactor tube. The zone in which the temperature falls further from 1100° C. is preferably shorter in the longitudinal direction of the reactor tube than the zone with the temperatures above 1100° C. The zone in which the temperature further falls from 1100° C. can have a length in the longitudinal direction of the reactor tube which is between 40% and 100% of the length of the zone with temperatures above 1100° C. in the longitudinal direction of the reactor tube. The zone in which the temperature falls further from 1100° C. can particularly have a length in the longitudinal direction of the reactor tube which is between 50% and 85% of the length of the zone with temperatures above 1100° C. in the longitudinal direction of the reactor tube. The zone in which the temperature falls further from 1100° C. can preferably have a length in the longitudinal direction of the reactor tube which is between 60% and 75% of the length of the zone with temperatures above 1100° C. in the longitudinal direction of the reactor tube.

In one preferred embodiment of the device according to the invention, further reactor chamber material containing chromium is arranged between the reactor tube material containing chromium, the same positioned during pyrolysis in the zone with temperatures above 1100° C., and the inlet of the reactor tube. The oven of the device can be operated in such a manner that during the pyrolysis, in a zone which adjoins the zone with temperatures above 1100° C., the temperature drops to a temperature of 500° C., preferably 300° C., and particularly preferably 180° C. with increasing proximity to the inlet of the reactor tube. In particular, the oven of the device can be operated in such a manner that the temperature drops evenly in the zone. Likewise, the oven of the device can be operated in such a manner that the temperature drops more sharply with lower temperatures. The material containing chromium in both temperature zones can particularly be the same material containing chromium. The same is particularly designed as a single, one-piece component of the reactor tube. The zone in which the temperature rises to 1100° C. is preferably shorter in the longitudinal direction than the zone with the temperatures above 1100° C. The zone in which the temperature rises to 1100° C. can have a length in the longitudinal direction of the reactor tube which is between 5% and 30% of the length of the zone with temperatures above 1100° C. in the longitudinal direction of the reactor tube. The zone in which the temperature rises to 1100° C. can particularly have a length in the longitudinal direction of the reactor tube which is between 10% and 20% of the length of the zone with temperatures above 1100° C. in the longitudinal direction of the reactor tube. In one embodiment of the device according to the invention, the zone with temperatures above 1100° C. can be generated only in a subvolume of the reactor which makes up at least 70% of the reactor volume.

In one embodiment of the device according to the invention, the device includes a reactor with material containing chromium, with a reactor chamber having material containing chromium, designed as a reactor tube, wherein the reactor tube's material containing chromium is arranged over the length of the reactor tube, including two barrier layers at the inlet and outlet of the reactor tube.

In one embodiment of the device according to the invention, the device includes a reactor with material containing chromium, with a reactor chamber having material containing chromium, wherein heat-stable materials packed intermittently are arranged between the reactor chamber's material containing chromium and the outlet of the reactor chamber, and do not contain any hydrogen and/or do not react with molecular hydrogen at temperatures≥1100° C.

In one embodiment of the device according to the invention, the device includes a reactor with material containing chromium, wherein silver wool is arranged in the first region of the reactor, as a halogen trap, where there is a temperature zone between 500° C. and 800° C. during pyrolysis due to the generated temperature zone≥1100° C.

The methods and reactors are used according to the invention for the online mass spectrometric determination of hydrogen isotope ratios in known apparatuses and/or analyzers for elemental analysis and/or for high-temperature conversion (in HTC systems). The molecular hydrogen recovered by pyrolysis of the substance being analyzed serves in this case as a measurement gas, and therefore allows a determination of the $\delta^2H$ values, by way of example by means of an isotope ratio mass spectrometer (IRMS). The pyrolysis reactor can be connected to the IRMS in the conventional manner via a gas chromatography column. The gas chromatography column is tempered (preferably at approx. 60-100° C.). The substances being analyzed are conventionally packed into silver or zinc capsules and are discharged by a sample discharger (autosampler) into the pyrolysis reactor at regular intervals according to a preset timing program. In one preferred embodiment, the substances being analyzed are collected in a graphite crucible which functions as a metal complexer, and are discharged by a sample discharger (autosampler) into the pyrolysis reactor at regular intervals according to a preset timing program. Helium is preferably used as the carrier gas.

The methods and reactors are also used according to the invention for the online mass spectrometric determination of hydrogen isotope ratios in known apparatuses and/or analyzers for high-temperature conversion (in HTC systems), wherein the solid, liquid, or gaseous substances from which the molecular hydrogen will be recovered are divided into their components by means of gas chromatography prior to entry into the reactor. The molecular hydrogen recovered by pyrolysis of the substance being analyzed serves in this case as a measurement gas, and therefore allows a determination of the $\delta^2H$ values, by way of example by means of an isotope ratio mass spectrometer (IRMS). The pyrolysis reactor is connected to the IRMS in the conventional manner via a transfer capillary and an open split interface. Helium is preferably used as the carrier gas.

The subject matter of the invention is therefore also a mass spectrometer which includes a device according to the invention for the quantitative recovery of molecular hydrogen from solid, liquid, or gaseous substances which have heteroatoms, by pyrolysis.

In one embodiment of the mass spectrometer according to the invention, the solid, liquid, or gaseous substances from which the molecular hydrogen will be recovered can be divided into their components by means of gas chromatography prior to entry into the reactor of the device according to the invention used for the quantitative recovery of molecular hydrogen from solid, liquid, or gaseous substances which have heteroatoms. For this purpose, the mass spectrometer preferably has a gas chromatography unit in which the solid, liquid, or gaseous substances from which the molecular hydrogen will be recovered can be separated.

The determination of the hydrogen isotope ratio $^2H/^1H$ in a given organic or inorganic sample is of importance in, by way of example, geology, hydrology, anthropology, ecology, food science, and medicine, and can be carried out effectively online by the uses of reactors, the methods, the reactors, devices, and mass spectrometers according to the invention.

The spectrum of substances to analyze can be significantly expanded by means of the uses of reactors, the methods, the reactors, devices, and mass spectrometers according to the invention, producing 100% hydrogen, and, by way of example, geologic minerals, keratins, organic mixtures, hooves, nails, and much more can be subjected to a precise analysis.

The description of the invention also describes and includes every embodiment of the invention which arises from each combination of the described features of the invention, even if the features of the invention are described in embodiments of the invention which are described differently. This applies regardless of whether the features are described in a use, an object such as a reactor, a device, or a mass spectrometer, or in a method.

DETAILED DESCRIPTION OF EMBODIMENTS

Figure 1:
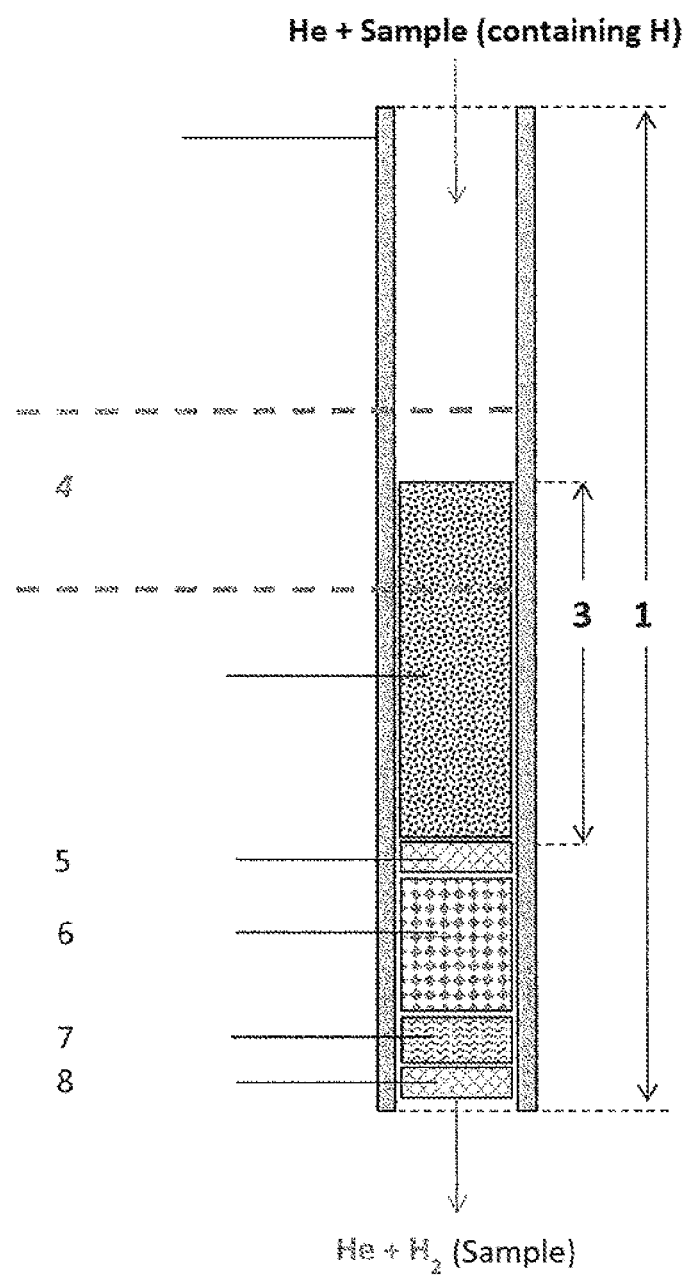
FIG. 1: First embodiment of a single-walled reactor with a packing containing chromium
Figure 2:
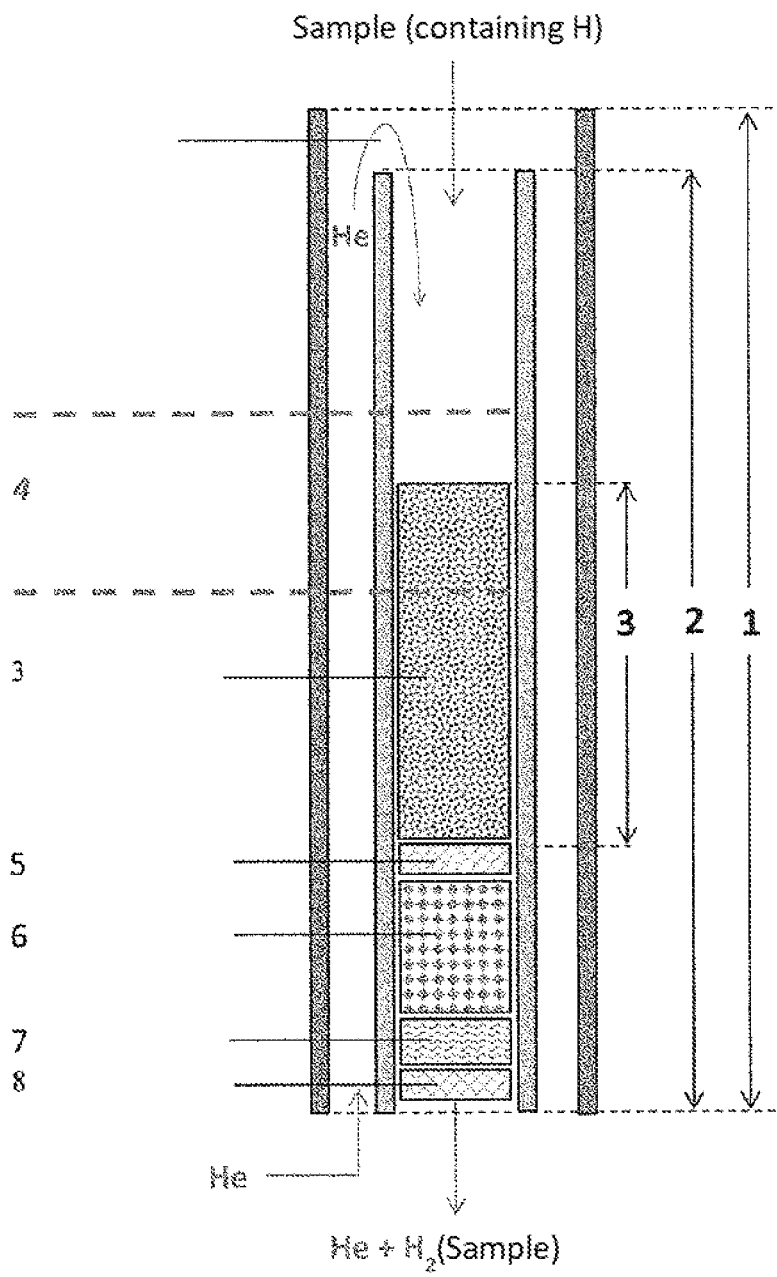
FIG. 2: A double-walled reactor with a packing containing chromium
Figure 3:
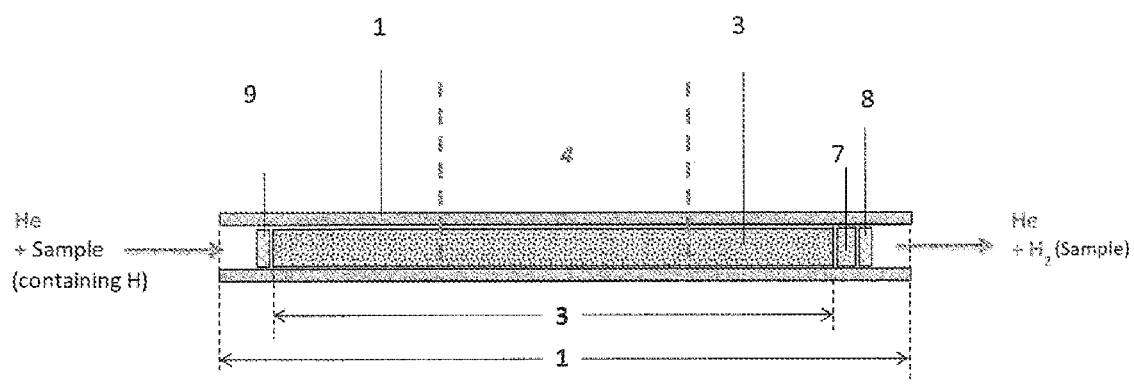
FIG. 3: Second embodiment of a single-walled reactor with a packing containing chromium

In the figures, reference numbers which are the same indicate the same features of the invention. The illustrations in FIGS. 1 to 3 show a certain ratio of the dimensions of the individual components of the reactor, to thereby illustrate one embodiment. In the following legends, other parameters are deliberately given for the components, to thereby describe a further embodiment of the reactor shown in the figures.

Legend for FIGS. 1 and 2:
1 Reactor tube (ceramic); length: 450 mm
2 Inner reactor tube (glassy carbon); length of the packing: 220 mm
3 Chromium filling: chromium powder/particles with a diameter of 0.1 to 5 mm, length: 80 mm
4 Hottest zone 1100 to 1800° C.
5 Quartz wool: length: 10 mm
6 Quartz chips: length: 100 mm
7 Silver wool (optional); length: 20 mm (integrated into the quartz layer, the total length of which remains 100 mm)
8 Quartz wool: length: 20 mm Legend for FIG. 3:
1 Reactor tube (ceramic); length: 320 mm, outer diameter 1/16 inch, Inner diameter: 0.8 mm
3 Chromium filling: chromium powder/particles with a diameter of 0.25 mm, length: 240 mm 4 Hottest zone 1100 to 1500° C.
7 Silver wool (optional); length: 20 mm
8 Length of the quartz wool at the outlet: 20 mm
9 Length of the quartz wool at the inlet: 20 mm Example 1

Use example, based on caffeine, using a double-walled pyrolysis reactor according to FIG. 2:

Solid samples are weighed in silver capsules. The silver capsules are placed in the autosampler of the analyzer (EA). From there, the samples drop individually into the pyrolysis reactor, wherein the silver capsule melts in the hot zone and the sample decomposes. The fluid reaction products are transported with the carrier gas helium through a gas chromatography column to the open split module. From there, the carrier gas stream including the $H_2$ enters the isotope ratio mass spectrometer, wherein the ion streams of the masses are determined and compared to those of a calibrated reference gas.

The reaction is carried out by means of a standard high-temperature conversion system for elemental analysis (HTC System; e.g. TC/EA from Thermo Fisher Scientific GmbH, Bremen, Germany, without chromium) and a high-temperature conversion system for elemental analysis (Cr-EA system) according to the invention.

Figure 4:
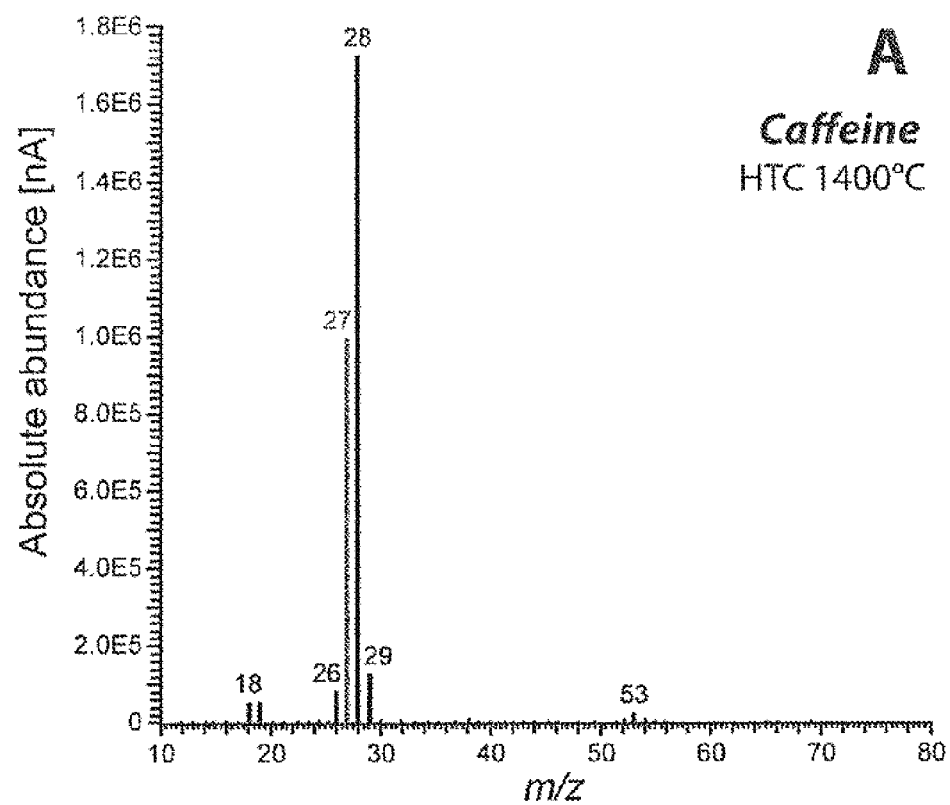
FIG. 4: Byproduct measurement with the reactor according to FIG. 2 in an HTC system
Figure 5:
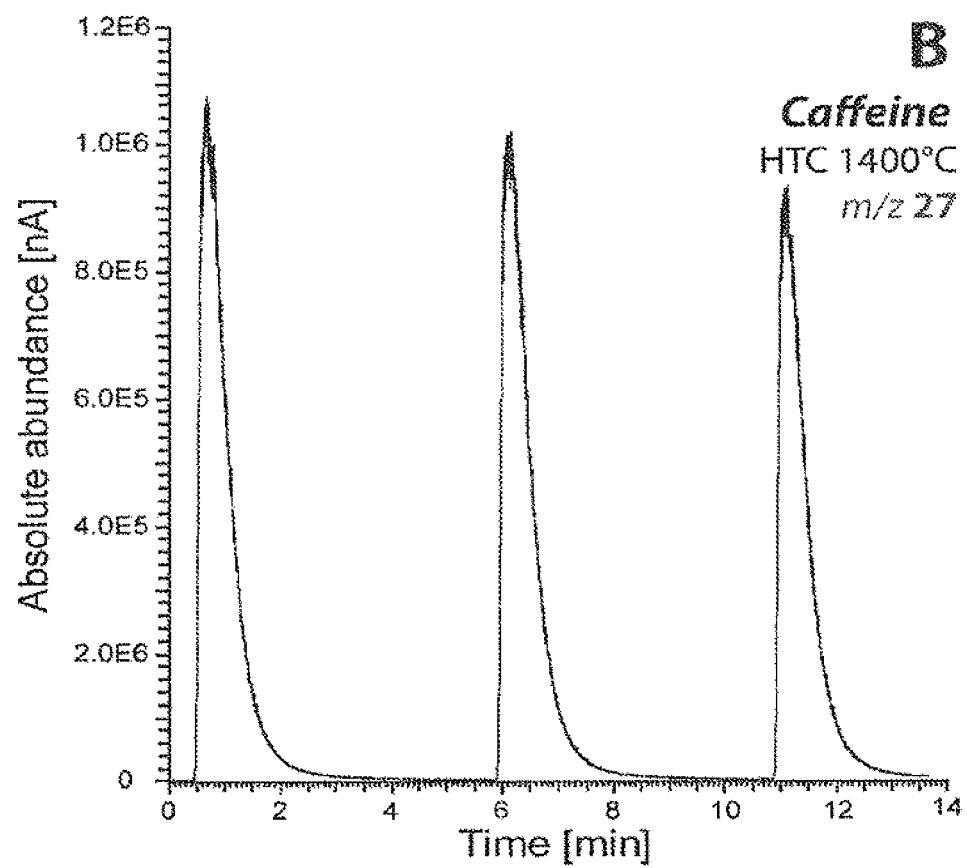
FIG. 5: Detection of mass 27 with the reactor according to FIG. 2 in an HTC system

As can be seen in the attached FIGS. 4 and 5, the known HTC system leads to the formation of byproducts which limit the yield of molecular hydrogen to a maximum of 60-70%.

Figure 6:
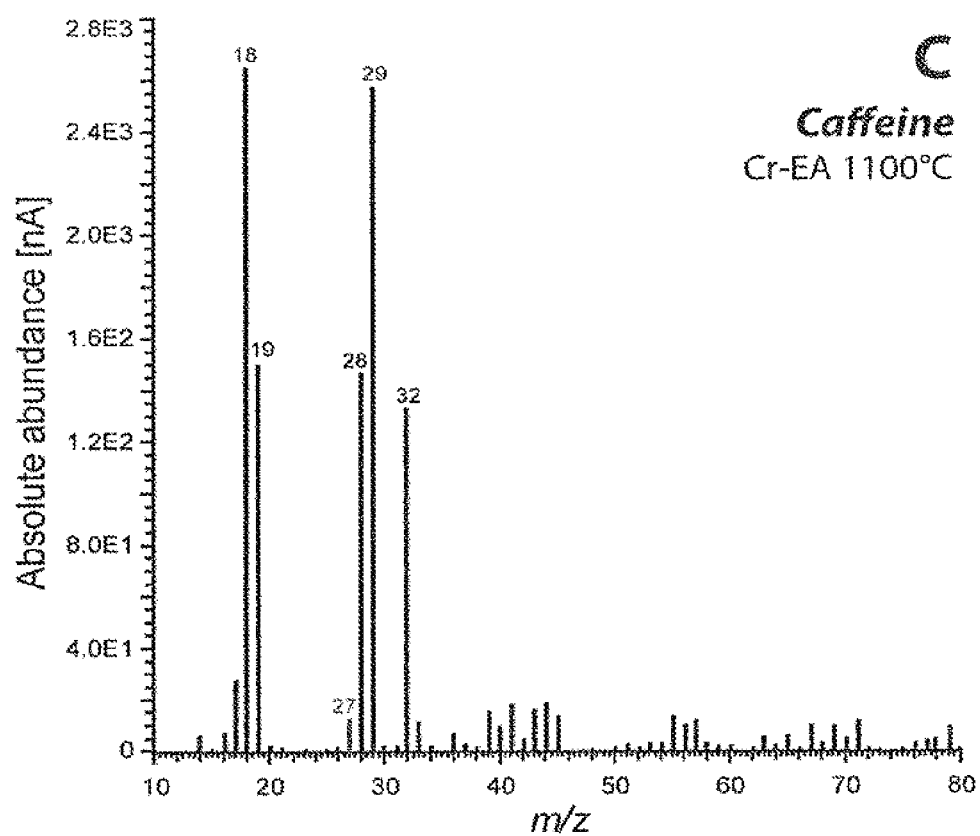
FIG. 6: Byproduct measurement with the reactor according to FIG. 2 in a Cr-EA system
Figure 7:
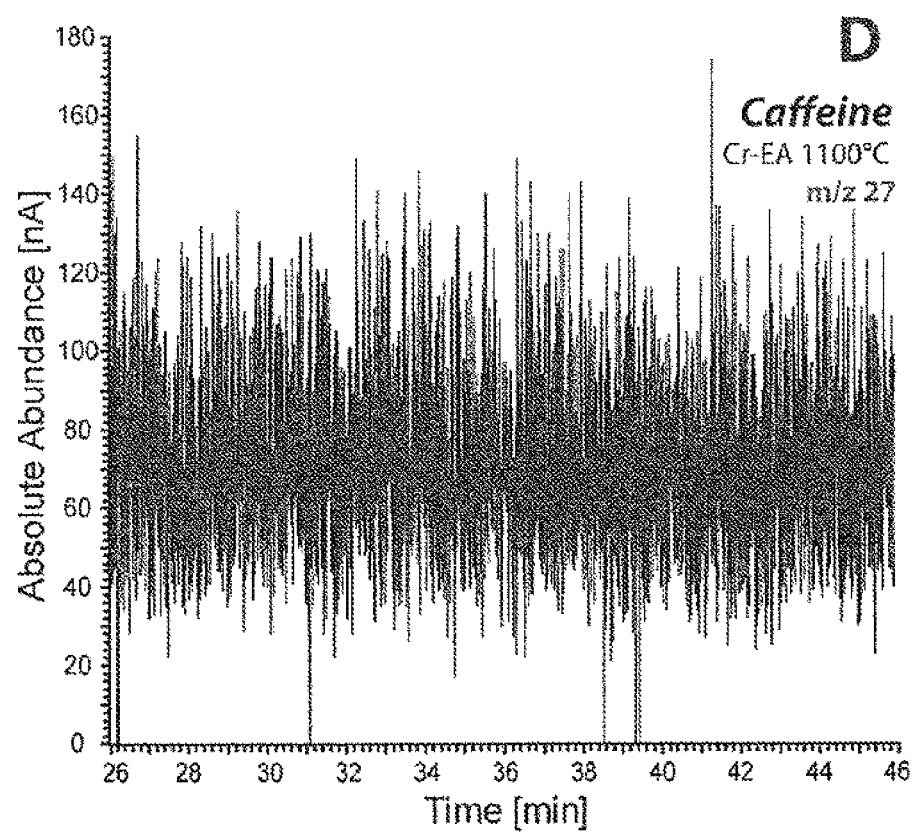
FIG. 7: Detection of mass 27 with the reactor according to FIG. 2 in a Cr-EA system

FIGS. 6 and 7 show that a nearly 100% yield is achieved using the reactor and method according to the invention.

Example 2

Use example, based on caffeine, using a pyrolysis reactor according to FIG. 3

The fluid reaction products are transported with the carrier gas helium through a gas chromatography column to the open split module. From there, the carrier gas stream including the $H_2$ enters the isotope ratio mass spectrometer, wherein the ion streams of the masses are determined and compared to those of a calibrated reference gas.

The reaction is carried out by means of a standard high-temperature conversion system (GC/HTC System; e.g. standard TC/GC system, e.g. from Thermo Fisher Scientific GmbH, Bremen, Germany, without chromium) and a high-temperature conversion system (GC-Cr system) according to the invention. In this case, the caffeine has been divided into its components by means of gas chromatography prior to entry in the pyrolysis reactor.

Figure 8:
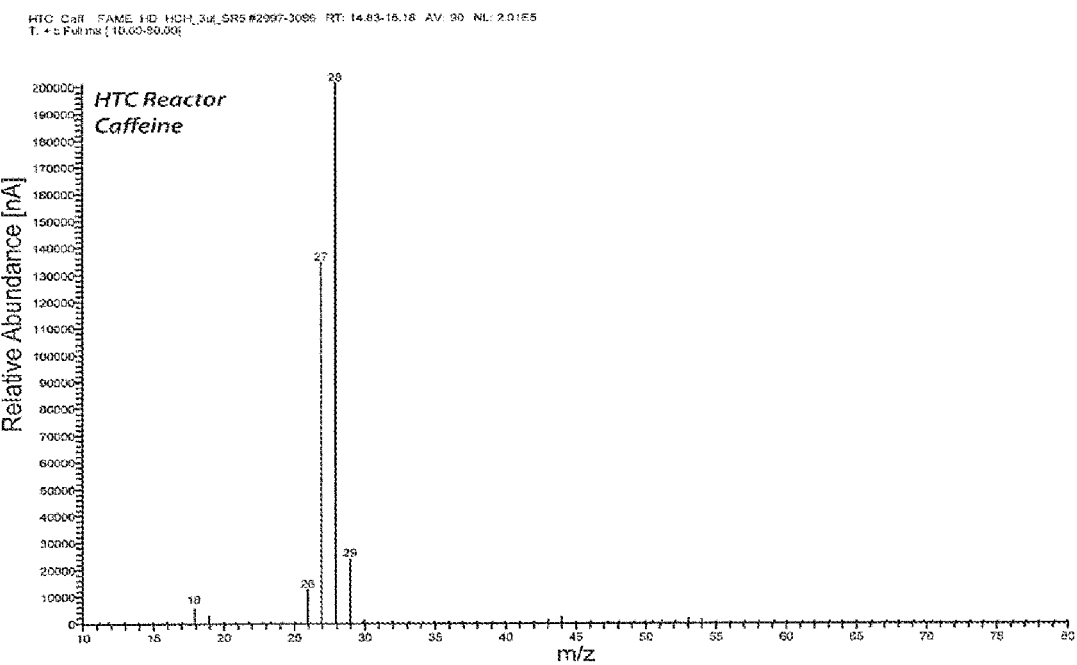
FIG. 8: Byproduct measurement with the reactor according to FIG. 3 in a GC/HTC system
Figure 9:
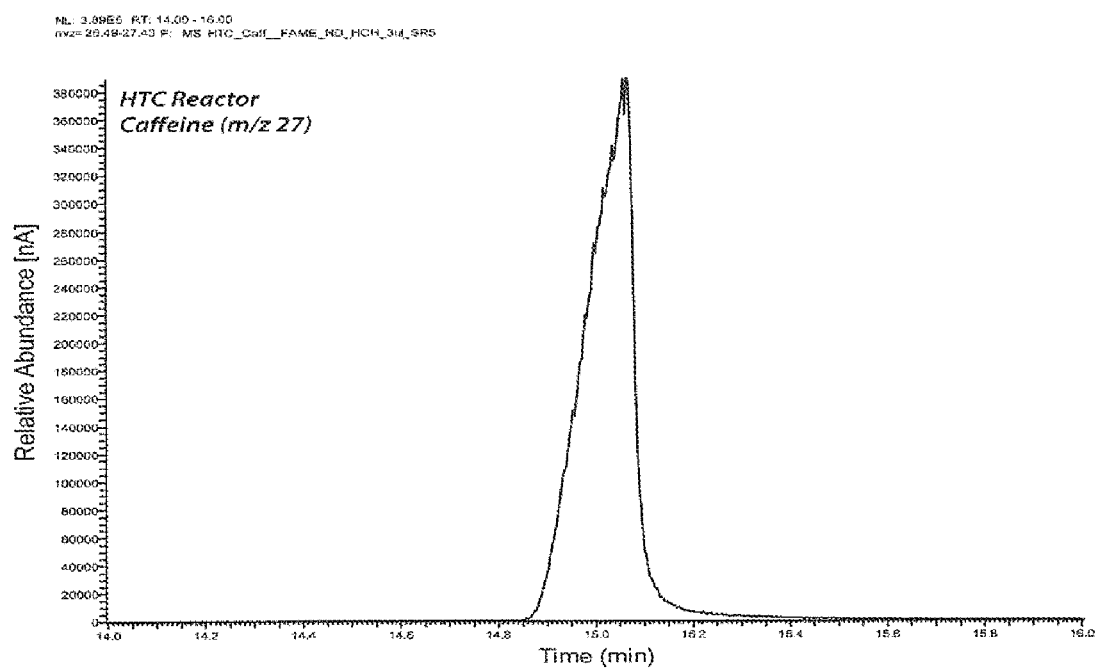
FIG. 9: Detection of mass 27 with the reactor according to FIG. 3 in a GC/HTC system

As can be seen in the attached FIGS. 8 and 9, the known GC/HTC system leads to the formation of byproducts which limit the yield of molecular hydrogen to a maximum of 60-70%.

Figure 10:
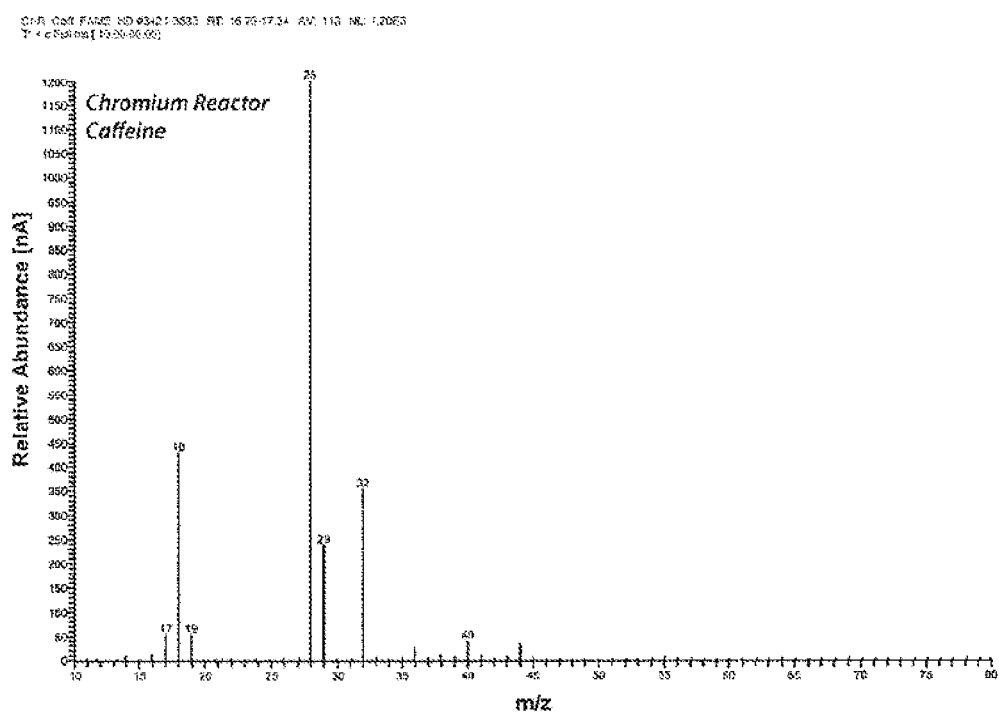
FIG. 10: Byproduct measurement with the reactor according to FIG. 3 in a GC-Cr system
Figure 11:
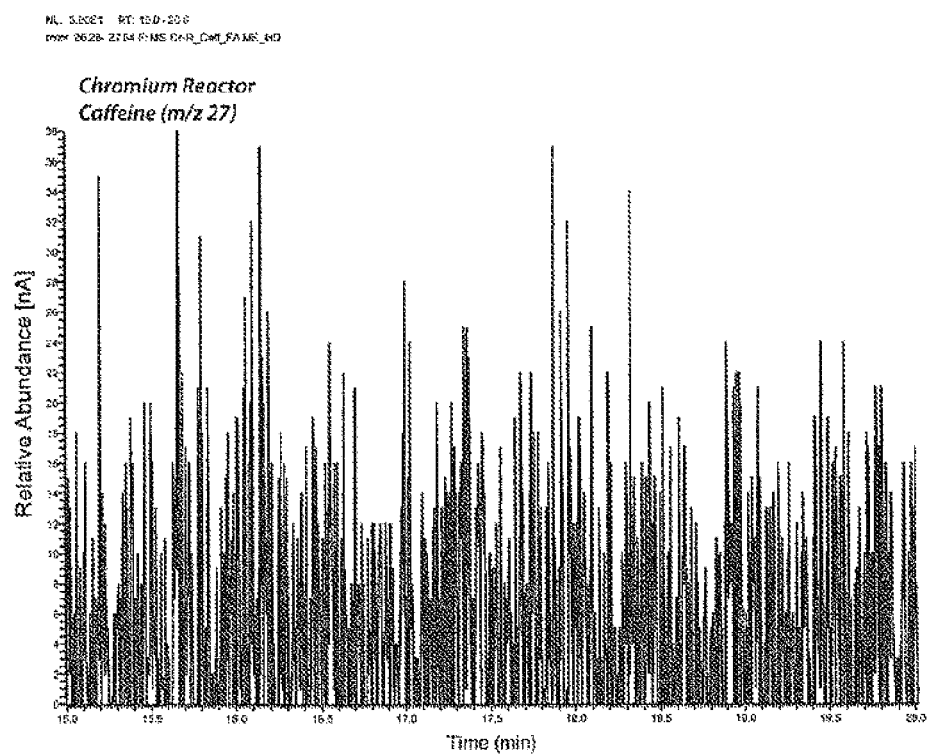
FIG. 11: Detection of mass 27 with the reactor according to FIG. 3 in a GC-Cr system

FIGS. 10 and 11 show that a nearly 100% yield is achieved using the reactor and method according to the invention.

The results of the measurements in Examples 1 and 2 are explained in the following:

FIGS. 4 and 5, as well as 8 and 9: Formation of byproducts containing hydrogen (HCN) during the conversion of the hydrogen in the molecule into molecular hydrogen in the HTC system, and the GC/HTC system:

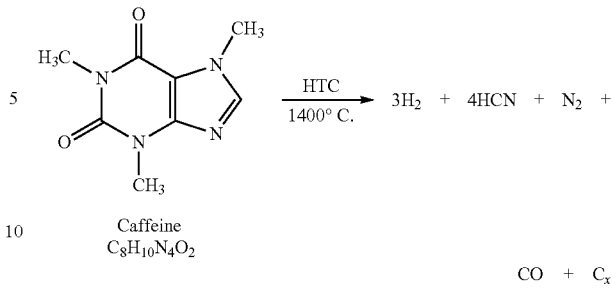

Caffeine
$C_8H_{10}N_4O_2$

FIGS. 6 and 7, as well as 10 and 11: no formation of byproducts during the conversion of the hydrogen in the molecule into molecular hydrogen in the Cr-EA system and the GC-Cr system:

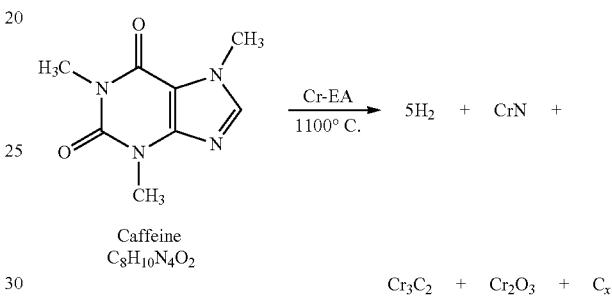

Caffeine
$C_8H_{10}N_4O_2$

FIGS. 4 and 5: Byproduct measurements with the HTC system, detection of the mass 27 (HCN) in the region of >1 mA, ~10,000 times higher than in the Cr-EA system.

FIGS. 6 and 7: Byproduct measurements with the Cr-EA system, no detection of the mass 27 is possible (HCN), air/water substrate in the region<0.1 µA.

FIGS. 8 and 9: Byproduct measurements with the GC/HTC system, detection of the mass 27 (HCN) in the region>0.4 mA, ~10,000 times higher than in the GC-Cr system.

FIGS. 10 and 11: Byproduct measurements with the GC-Cr system, no detection of the mass 27 is possible (HCN), air/water substrate in the region<0.4 µA.

Example 3

Use example, based on hexachlorocyclohexane, using a pyrolysis reactor according to FIG. 3:

The fluid reaction products are transported with the carrier gas helium through a gas chromatography column to the open split module. From there, the carrier gas stream including the $H_2$ enters the isotope ratio mass spectrometer, wherein the ion streams of the masses are determined and compared to those of a calibrated reference gas.

The reaction is carried out by means of a standard high-temperature conversion system (GC/HTC System; e.g. standard TC/GC system, e.g. from Thermo Fisher Scientific GmbH, Bremen, Germany, without chromium) and a high-temperature conversion system (GC-Cr system) according to the invention. In this case, the hexachlorocyclohexane has been divided into its components by means of gas chromatography prior to entry in the pyrolysis reactor.

Figure 12:
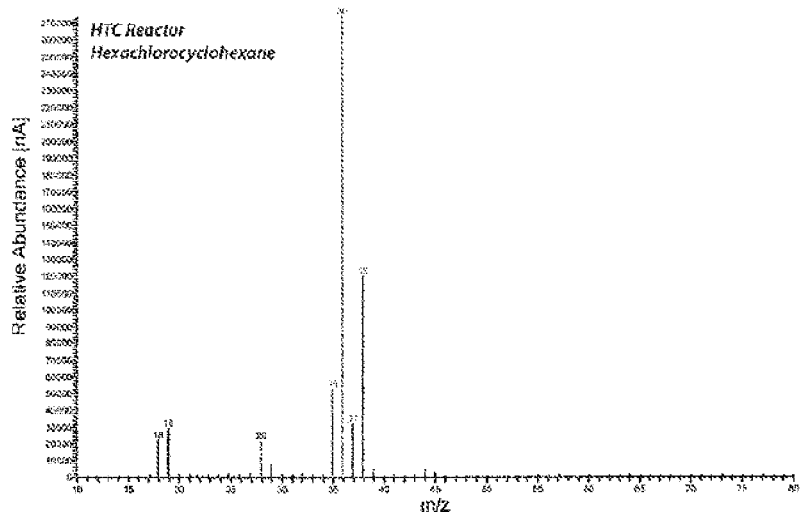
FIG. 12: Byproduct measurement with the reactor according to FIG. 3 in a GC/HTC system
Figure 13:
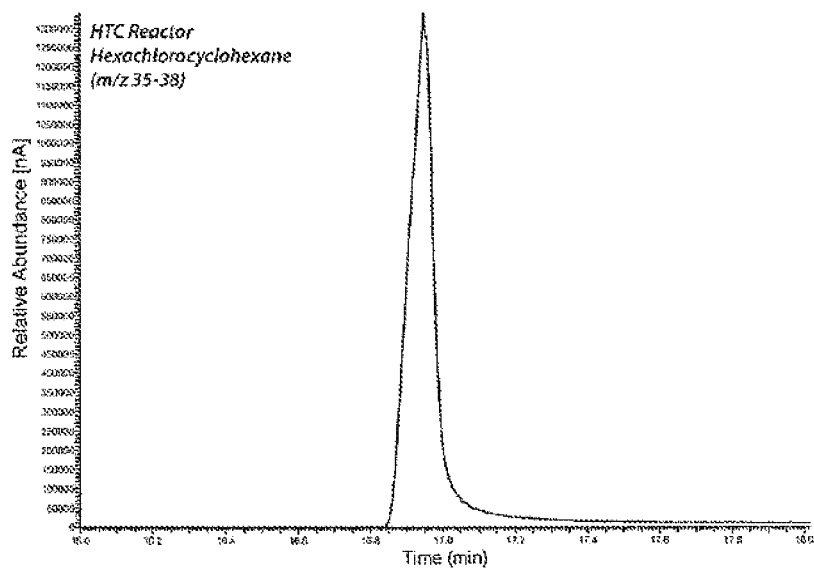
FIG. 13: Detection of mass 35 to 38 with the reactor according to FIG. 3 in a GC/HTC system

FIGS. 12 and 13: Formation of byproducts containing hydrogen (HCl) during the conversion of the hydrogen in the molecule into molecular hydrogen in the GC/HTC system:

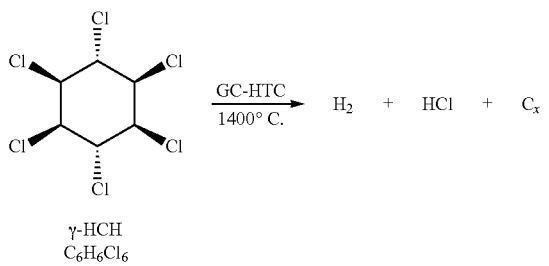

γ-HCH
C₆H₆Cl₆

Figure 14:
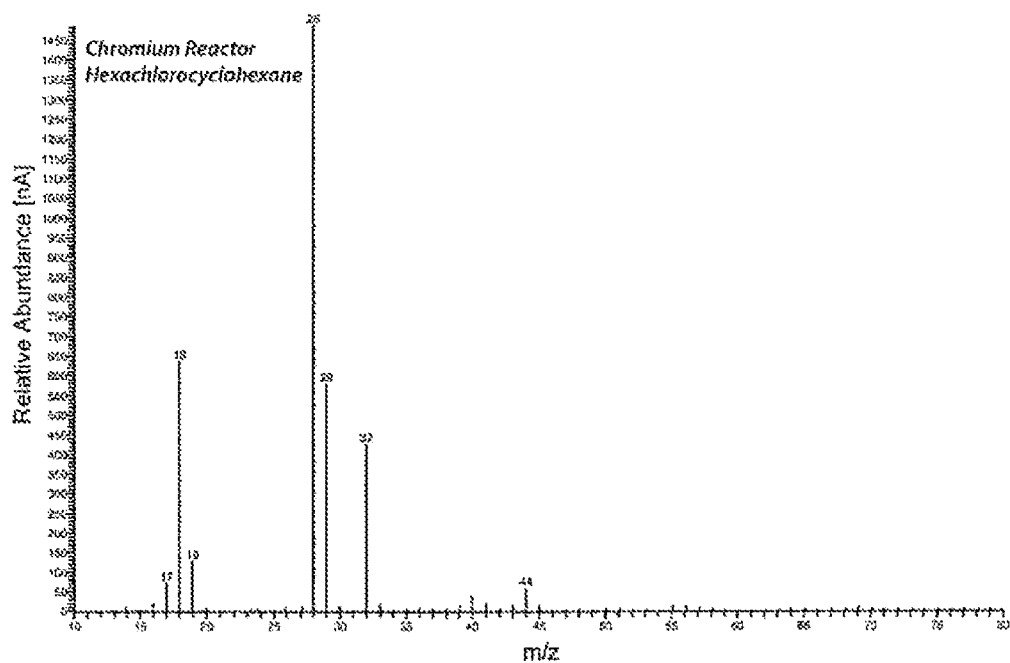
FIG. 14: Byproduct measurement with the reactor according to FIG. 3 in a GC-Cr system
Figure 15:
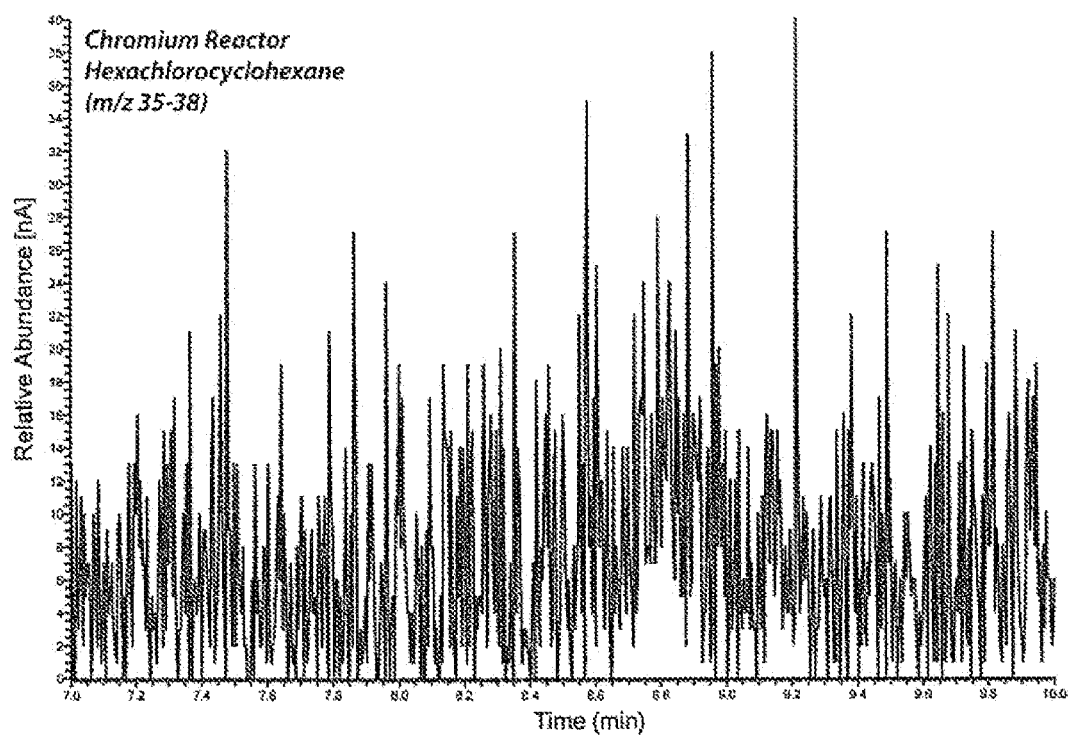
FIG. 15: Detection of mass 35 to 38 with the reactor according to FIG. 3 in a GC-Cr system

FIGS. 14 and 15: No formation of byproducts containing hydrogen (HCl) during the conversion of the hydrogen in the molecule into molecular hydrogen in the GC-Cr system

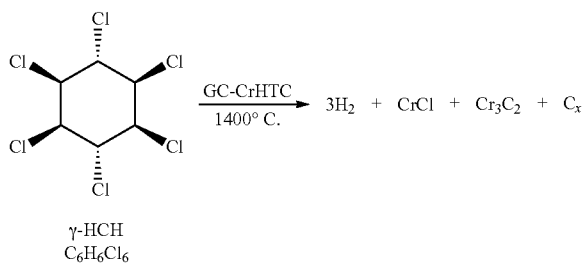

γ-HCH
C₆H₆Cl₆

As can be seen in the attached FIGS. 12 and 13, the known GC/HTC system leads to the formation of byproducts which limit the yield of molecular hydrogen to a maximum of 60-70%.

FIGS. 14 and 15 show that a nearly 100% yield is achieved using the reactor and method according to the invention.

The invention claimed is:

1. A method for the quantitative recovery of molecular hydrogen from a sample of solid, liquid, or gaseous substances which have heteroatoms, comprising:
   introducing the sample, via an inlet, into a pyrolysis reactor with material containing chromium;
   performing pyrolysis of the sample to form hydrogen, characterized in that a zone with temperatures above 1100° C. is generated in the pyrolysis reactor, in which a reactive chromium layer of the material containing chromium of the pyrolysis reactor is at least partially arranged within the zone and adjacent to a quartz layer; and
   providing the hydrogen via an outlet of the pyrolysis reactor, the reactive chromium layer of the material containing chromium arranged between the inlet and the quartz layer, and the quartz layer arranged between the chromium layer and the outlet of the pyrolysis reactor, the quartz layer including quartz wool, and a layer of chippings arranged next to the quartz layer, the layer of chippings including one or more of: quartz, ceramic, or glassy carbon.

2. The method according to claim 1, wherein the zone with temperatures above 1100° C. is generated in the reactor to pyrolize substance.

3. The method according to claim 2, characterized in that the pyrolysis of the substances is carried out using a carrier gas.

4. The method according to claim 3, characterized in that the reactor's material containing chromium ensures a flow of carrier gas of up to 10 mL/min.

5. The method according to claim 3, characterized in that the reactor's material containing chromium ensures a flow of carrier gas of up to 300 mL/min.

6. The method according to claim 3, characterized in that the reactor's material containing chromium ensures a flow of carrier gas of up to 1000 mL/min.

7. The method according to claim 2, characterized in that the reactor is positioned in an apparatus for high-temperature conversion (in HTC systems).

8. The method according to claim 2, characterized in that the reactor is positioned in an apparatus for elemental analysis.

9. The method according to claim 2, characterized in that the reactor is made at least partially of heat-resistant materials suitable for pyrolysis of inserted substances at temperatures≥1100° C., which do not allow the passage of molecular hydrogen from the inside or of air from the outside.

10. The method according to claim 1, characterized in that at least one section of a reactor inner wall is made of, at least on its inner side, material containing chromium, and/or at least one section of a reactor inner wall has a coating containing chromium, and/or a material containing chromium is embedded in at least one section of a reactor inner wall, at least on its inner side.

11. The method according to claim 1, characterized in that the reactor's material does not contain any hydrogen or do not react with molecular hydrogen above 1100° C.

12. The method according to claim 1, characterized in that silver wool is arranged in a first region of the reactor, as a halogen trap, where there is a temperature zone between 500° C. and 800° C. during pyrolysis due to the temperature zone generated above 1100° C.

13. The method according to claim 1, characterized in that the solid, liquid, or gaseous substances from which the molecular hydrogen will be recovered are separated into their components by means of gas chromatography prior to entry into the reactor.

14. The method according to claim 1, characterized in that the zone with temperatures above 1100° C. is only generated in a subvolume of the pyrolysis reactor which makes up at most 50% of the reactor volume.

15. The method according to claim 1, characterized in that the reactor has at least one reactor tube with material containing chromium, in that the zone with temperatures above 1100° C. is generated over at least 90% of the length of the reactor tube in the direction of the longitudinal axis of the reactor tube, and in that the reactor tube's material containing chromium is arranged in the reactor tube at least over the length of the zone with temperatures above 1100° C.

16. The method according to claim 15, characterized in that the reactor's material containing chromium extends over 40% to 60% of the length of the zone with temperatures above 1100° C., in the longitudinal direction of the reactor tube.

17. The method according to claim 15, characterized in that the longitudinal axis of the reactor tube is oriented vertically, and the reactor tube's material containing chromium is present as a layer constructed horizontally.

* * * * *